United States Patent
Park et al.

(10) Patent No.: US 11,311,171 B2
(45) Date of Patent: Apr. 26, 2022

(54) ELECTRONIC DEVICE INCLUDING ROTATABLE MEMBER AND METHOD FOR OPERATING SAME

(71) Applicant: Samsung Electronics Co., Ltd., Suwon-si (KR)

(72) Inventors: Seolynn Park, Suwon-si (KR); Soojung Kim, Suwon-si (KR); Jongchae Moon, Suwon-si (KR); Goeun Lee, Suwon-si (KR); Jooyeon Cho, Suwon-si (KR); Minkyoung Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 297 days.

(21) Appl. No.: 16/680,996

(22) Filed: Nov. 12, 2019

(65) Prior Publication Data

US 2020/0146527 A1  May 14, 2020

(30) Foreign Application Priority Data

Nov. 13, 2018 (KR) .......................... 10-2018-0139369

(51) Int. Cl.
*G06F 3/0482* (2013.01)
*A47L 15/42* (2006.01)
(Continued)

(52) U.S. Cl.
CPC .......... *A47L 15/4293* (2013.01); *D06F 33/00* (2013.01); *D06F 34/28* (2020.02); *G06F 3/0482* (2013.01); *G06F 3/04817* (2013.01)

(58) Field of Classification Search
CPC .. G06F 3/04847; G06F 1/163; G06F 3/04817; G06F 3/0482; A47L 15/4293; D06F 34/28; D06F 33/00
See application file for complete search history.

(56) References Cited

U.S. PATENT DOCUMENTS

| 8,896,526 | B1 * | 11/2014 | Park | G06F 1/1694 |
| | | | | 345/156 |
| 10,514,822 | B2 * | 12/2019 | Lim | G06F 1/163 |
| (Continued) | | | | |

FOREIGN PATENT DOCUMENTS

| EP | 3 136 215 A1 | 3/2017 |
| KR | 10-2014-0005484 A | 1/2014 |

OTHER PUBLICATIONS

International Search Report with Written Opinion dated Feb. 17, 2020; International Appln. No. PCT/KR2019/015178.

*Primary Examiner* — Justin S Lee
(74) *Attorney, Agent, or Firm* — Jefferson IP Law, LLP

(57) ABSTRACT

An electronic device including a rotatable member and an operating method in the electronic device are provided. The electronic device includes a housing, a rotatable member rotatably arranged outside a part of the housing, a display exposed through a part of a front surface of the housing, a memory arranged inside the housing, and at least one processor arranged inside the housing so as to be connected to the display and the memory electrically or functionally. The memory may store instructions that, when executed, cause the at least one processor to control the display to display a first group including at least one object corresponding to at least one basic function on a screen of the display, and control the display to display a second group including at least one object corresponding to at least one additional function related to a user or the electronic device, together with the first group, on the screen in response to occurrence of an event.

16 Claims, 21 Drawing Sheets

(51) Int. Cl.
    *G06F 3/04817*     (2022.01)
    *D06F 33/00*     (2020.01)
    *D06F 34/28*     (2020.01)

(56) References Cited

U.S. PATENT DOCUMENTS

| | | | |
|---|---|---|---|
| 10,545,657 | B2 * | 1/2020 | Zambetti .............. G06F 3/0362 |
| 10,664,074 | B2 * | 5/2020 | Moussette ............. G04G 17/04 |
| 2003/0216816 | A1 | 11/2003 | Ito et al. |
| 2006/0139320 | A1 | 6/2006 | Lang |
| 2012/0130547 | A1 * | 5/2012 | Fadell ................ G05D 23/1917 |
| | | | 700/276 |
| 2013/0090767 | A1 * | 4/2013 | Bruck ................ G06F 3/04847 |
| | | | 700/276 |
| 2014/0208263 | A1 * | 7/2014 | Maklouf .............. G06T 3/0018 |
| | | | 715/802 |
| 2015/0116217 | A1 | 4/2015 | Choi et al. |
| 2016/0320756 | A1 | 11/2016 | Lee et al. |
| 2016/0334888 | A1 * | 11/2016 | Park ....................... G04G 21/08 |
| 2017/0003747 | A1 * | 1/2017 | Carceroni ............ G06F 1/3215 |
| 2017/0045958 | A1 * | 2/2017 | Battlogg .............. G06F 3/0487 |
| 2017/0321366 | A1 | 11/2017 | Oh et al. |
| 2017/0321367 | A1 | 11/2017 | Kim et al. |
| 2017/0364205 | A1 | 12/2017 | Chang et al. |
| 2018/0246640 | A1 | 8/2018 | Khajuria |
| 2020/0249802 | A1 * | 8/2020 | Boshoff ............. G06F 3/04883 |

* cited by examiner

| FUNCTION | A | B | C | D | E | F | G | H | I | J | K | L | M |
|---|---|---|---|---|---|---|---|---|---|---|---|---|---|
| NUMBER OF USAGES | 0 | 0 | 5 | 3 | 1 | 2 | 10 | 15 | 2 | 1 | 7 | 8 | 1 |

| FUNCTION | | A | B | C | D | E | F | G | H | I | J | K | L |
|---|---|---|---|---|---|---|---|---|---|---|---|---|---|
| NUMBER OF USAGES | USER A | 0 | 0 | 5 | 3 | 1 | 2 | 10 | 15 | 2 | 1 | 7 | 8 |
| | USER B | 2 | 4 | 5 | 1 | 0 | 0 | 0 | 7 | 11 | 0 | 0 | 0 |

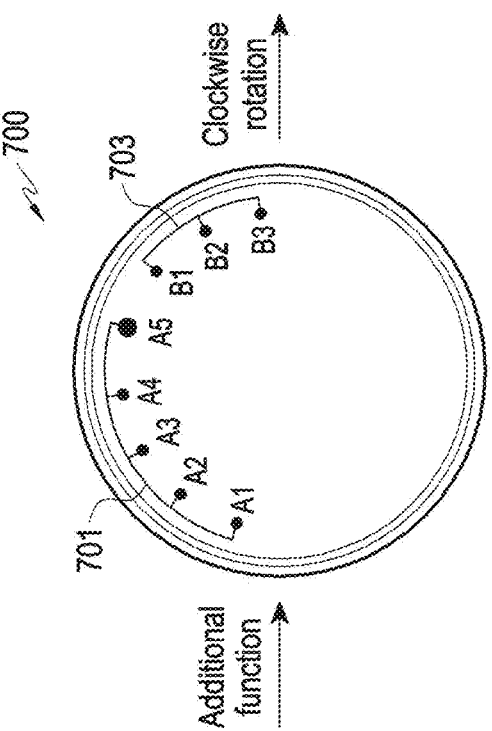
FIG.7A
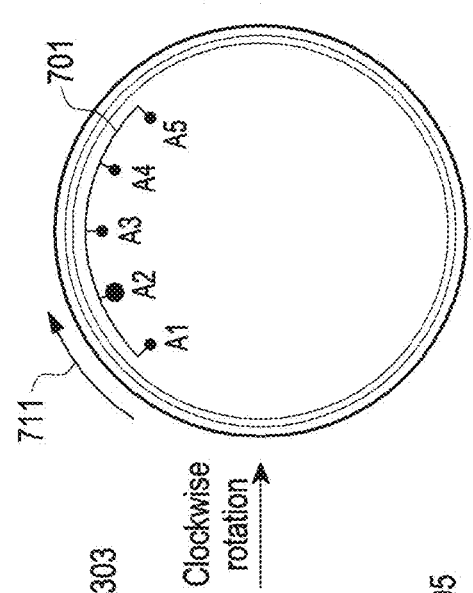
FIG.7B
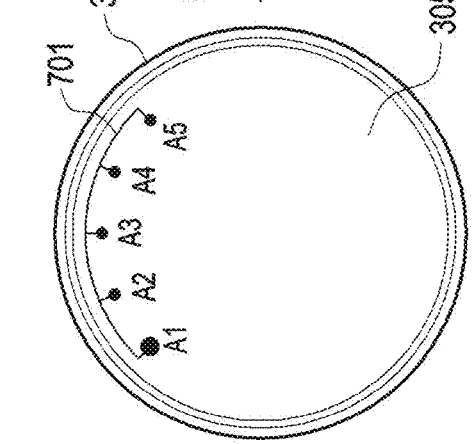
FIG.7C
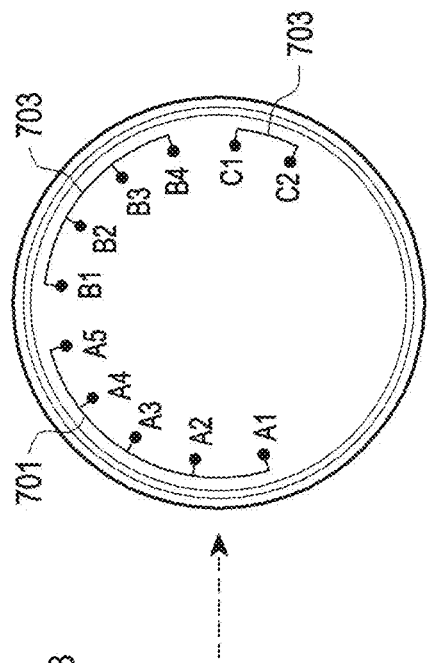
FIG.7D
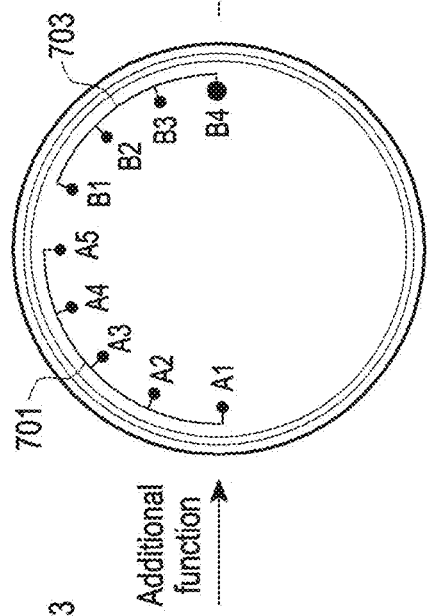
FIG.7E
FIG.7F

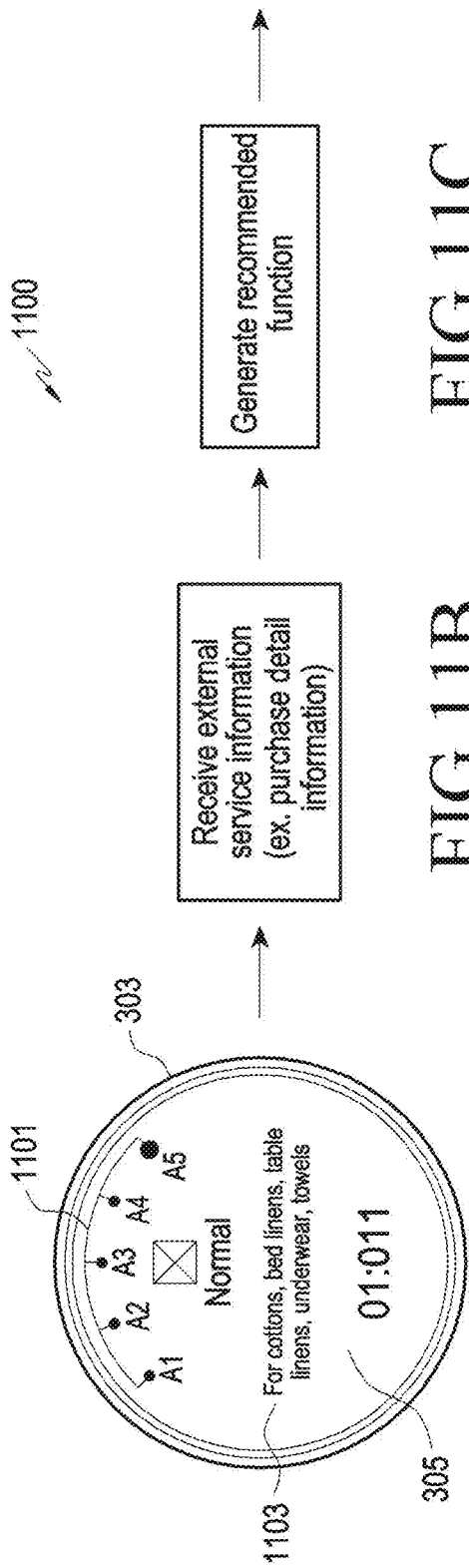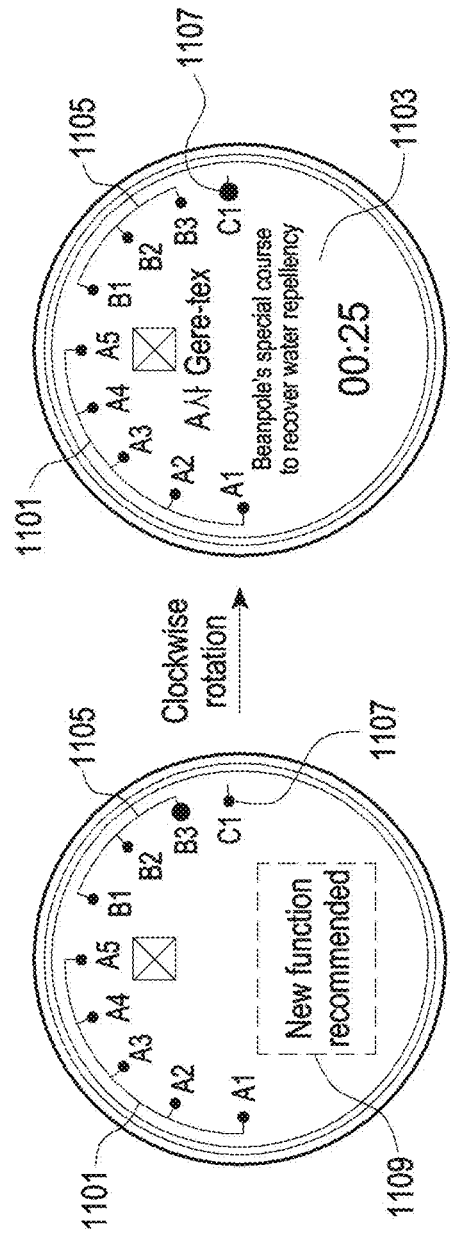

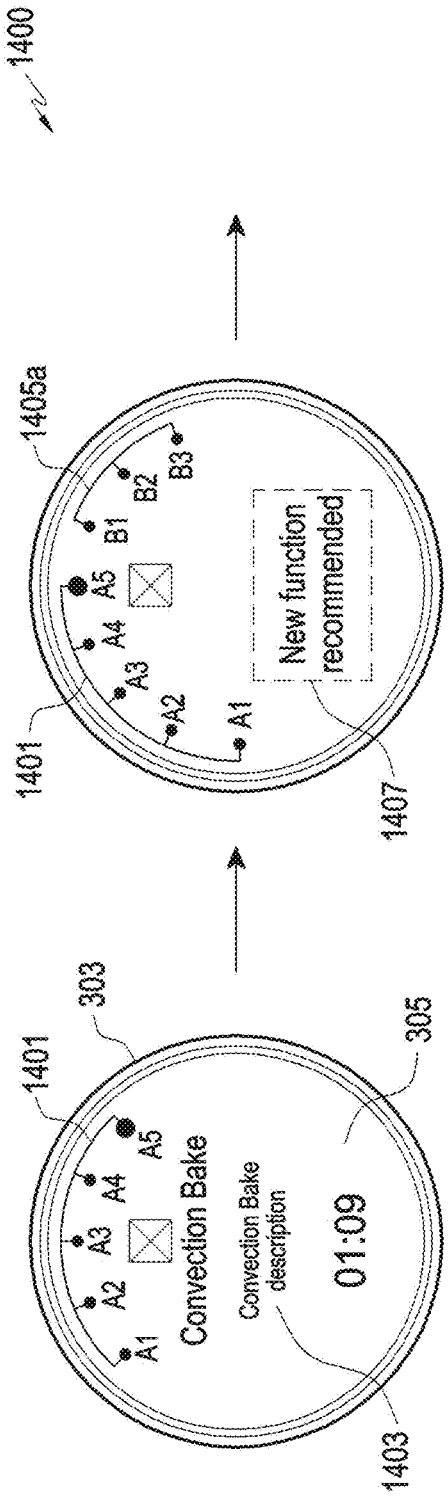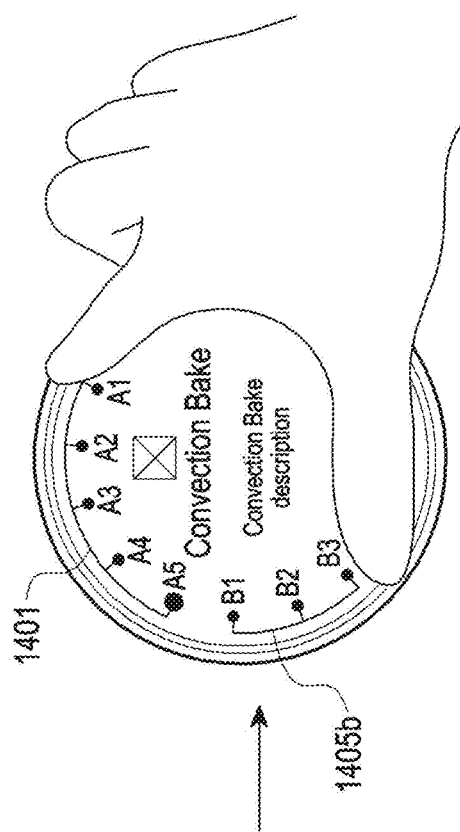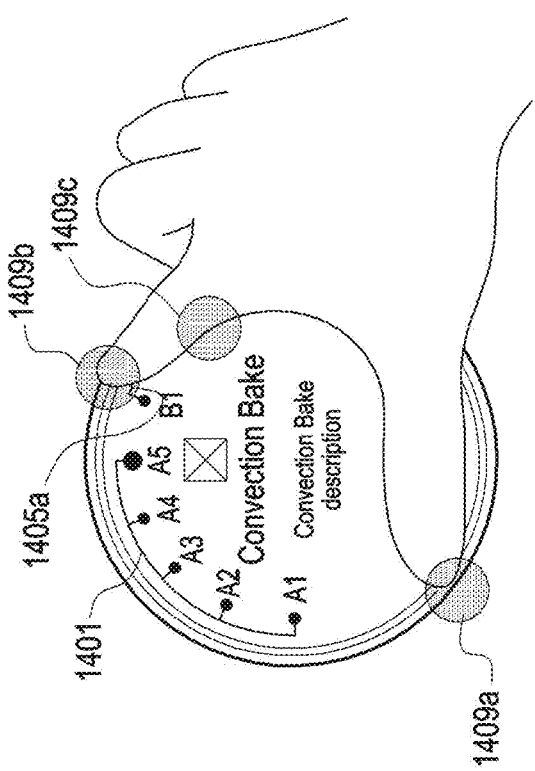

ELECTRONIC DEVICE INCLUDING ROTATABLE MEMBER AND METHOD FOR OPERATING SAME

CROSS-REFERENCE TO RELATED APPLICATION(S)

This application is based on and claims priority under 35 U.S.C. § 119(a) of a Korean patent application number 10-2018-0139369, filed on Nov. 13, 2018, in the Korean Intellectual Property Office, the disclosure of which is incorporated by reference herein in its entirety.

BACKGROUND

Field

The disclosure relates to an electronic device including a rotatable member and a method for operating the same.

Description of the Related Art

Recently, electronic devices have developed in various types for user convenience. Such electronic devices have gradually decreasing sizes while also having various integrated functions. These electronic devices, due to their small sizes, can be attached to or interlinked with various other devices (for example, home appliances), and may be configured as small rotatable devices that can rotate clockwise or counterclockwise, thereby enabling selection of functions provided by the other devices. Such rotatable electronic devices include, for example, a round handle-type knob attached to another device, a jog dial, and the like.

However, rotatable electronic devices simply enable selection of a function through a rotation and transmit a control signal such that the selected function can be executed by external devices to which the same are attached. Consequently, such electronic devices cannot recommend or add other functions than those provided or predesignated by the devices on which the same are mounted and cannot provide recommended or added functions such that users can intuitively check the same. Moreover, electronic devices provide designated functions only, meaning that the same are incapable of adaptively optimizing and providing functions according to the context.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an electronic device including a rotatable member and to provide an operating method for adaptively recommending a function in connection with the electronic device including a rotatable member, optimizing the recommended function, and providing the optimized function through the display.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a rotatable member rotatably arranged outside a part of the housing, a display exposed through a part of a front surface of the housing, a memory arranged inside the housing, and at least one processor arranged inside the housing so as to be connected to the display and the memory electrically or functionally. The memory may be configured to store instructions that, when executed, cause the at least one processor to control the display to display a first group including at least one object corresponding to at least one basic function on a screen of the display, and control the display to display a second group including at least one object corresponding to at least one additional function related to a user or the electronic device, together with the first group, on the screen in response to occurrence of an event.

In accordance with another aspect of the disclosure, a method for operating an electronic device including a housing is provided. The method includes the operations of controlling a display to display a first group including at least one object corresponding to at least one basic function on a screen of the display, the display being exposed through a part of a front surface of the housing of the electronic device, and controlling the display to display a second group including at least one object corresponding to at least one additional function related to a user or the electronic device, together with the first group, on the screen in response to occurrence of an event.

In accordance with another aspect of the disclosure, a non-transitory computer-readable recording medium in which a program to be executed by a computer is recorded is provided. The program includes executable instructions that, when executed by at least one processor, cause the at least one processor to control a display to display a first group including at least one object corresponding to at least one basic function on a screen of the display, the display being exposed through a part of a front surface of a housing of an electronic device including a rotatable member, and control the display to display a second group including at least one object corresponding to at least one additional function related to a user or the electronic device, together with the first group, on the screen in response to occurrence of an event.

In accordance with another aspect of the disclosure, an electronic device is provided including a rotatable member according to various embodiments that can display a function, which can be selected in response to a rotation of the rotatable member after optimizing the same for the display, and where the electronic device is applicable to various devices.

In accordance with another aspect of the disclosure, the electronic device is advantageous in that the same can provide an adaptive user interface by expanding additional functions related to the user or the electronic device and displaying the same on the display, together with basic functions, according to the context related to the user or the electronic device and can recommend and provide functions optimized for the user. Moreover, the electronic device provides an interface in an adaptive position, even inside the same display, according to the position of the user's hand or interworking of the device such that the user can easily control the same.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A, 7B, 7C, 7D, 7E, and 7F are diagrams illustrating screens related to an operating procedure of an electronic device according to various embodiments of the disclosure;

FIGS. 11A, 11B, 11C, 11D, and 11E are diagrams further illustrating screens related to an operating procedure of an electronic device according to various embodiments of the disclosure;

FIGS. 14A, 14B, 14C, and 14D are diagrams further illustrating screens related to an operating procedure of an electronic device according to various embodiments of the disclosure;

Throughout the drawings, like reference numerals will be understood to refer to like parts, components, and structures.

DETAILED DESCRIPTION

Figure 1:
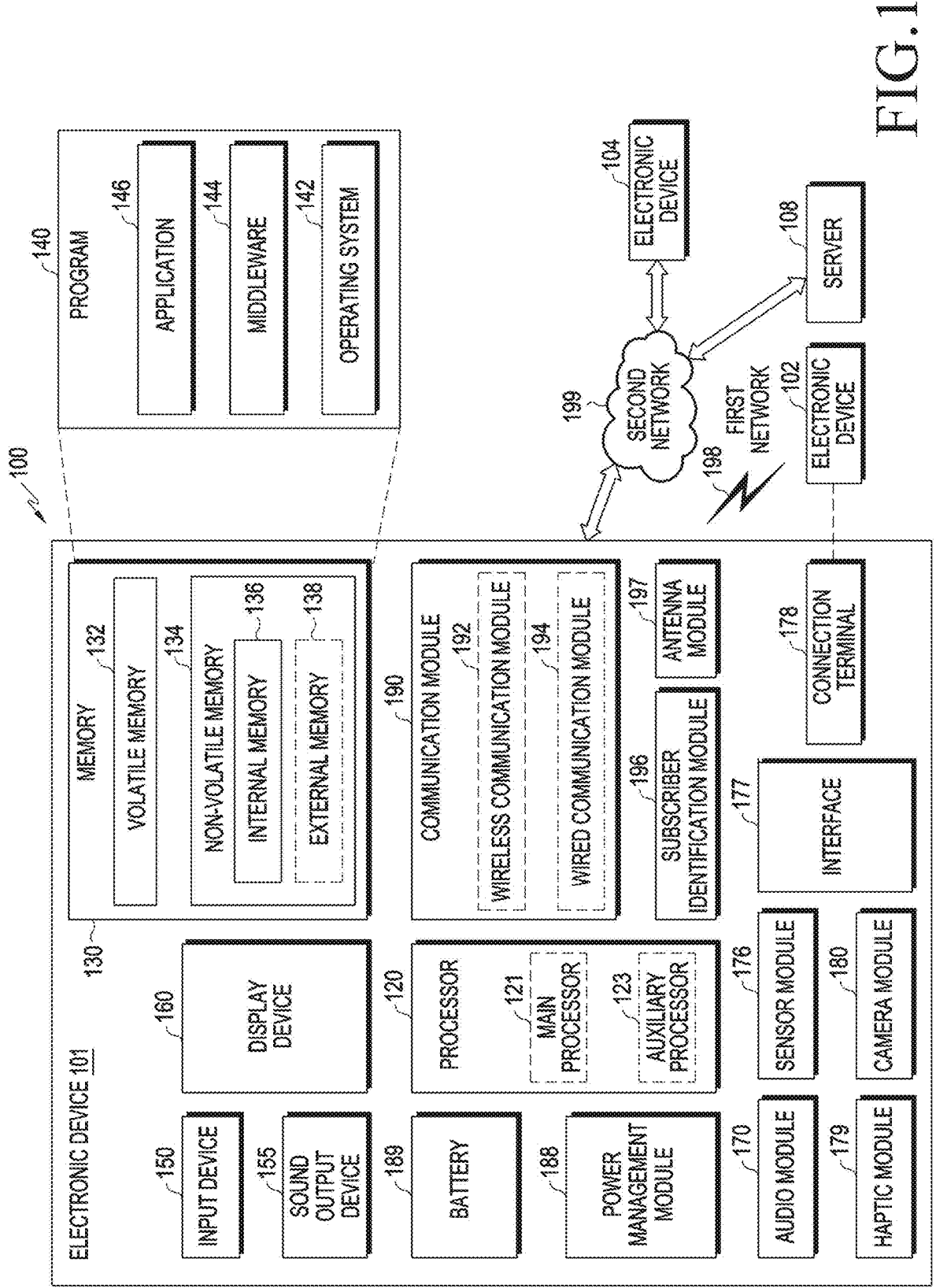
FIG. 1 is a block diagram illustrating a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments disclosed herein may be various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a compiler or a code executable by an interpreter. The machine-readable storage media may be provided in the form of non-transitory storage media. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device inside a network environment according to an embodiment of the disclosure.

Referring to FIG. 1, an electronic device 101 inside a network environment 100 may communicate with an electronic device 102 through a first network 198 (for example, a short-distance wireless communication network), or may communicate with an electronic device 104 or a server 108 through a second network 199 (for example, a long-distance wireless communication network). According to an embodiment, the electronic device 101 may communicate with the electronic device 104 through the server 108. According to an embodiment, the electronic device 101 may include at least one processor 120, a memory 130, an input device 150, a sound output device 155, a display device 160, an audio module 170, a sensor module 176, an interface 177, a haptic module 179, a camera module 180, a power management module 188, a battery 189, a communication module 190 such as a transceiver, a subscriber identification module 196, and/or an antenna module 197. In some embodiments, at least one of the constituent elements of the electronic device 101 (for example, the display device 160 or the camera module 180) may be omitted or the same may further include at least one other constituent element. In some embodiments, some of the constituent elements may be implemented as a single integrated circuit. For example, the sensor module 176 (for example, a fingerprint sensor, an iris sensor, or a luminance sensor) may be implemented while being embedded in the display device 160 (for example, a display).

The processor 120 may, for example, control at least one different constituent element (for example, hardware or software constituent element) of the electronic device 101 connected to the processor 120 by executing software (for example, a program 140) and may perform various kinds of data processing or operations. According to an embodiment, as at least a part of the data processing or operations, the processor 120 may load a command or data received from another constituent element (for example, the sensor module 176 or the communication module 190) in a volatile memory 132, may process the command or data stored in the volatile memory 132, and may store the result data in a nonvolatile memory 134. According to an embodiment, the processor 120 may include a main processor 121 (for example, a central processing device or an application processor) and an auxiliary processor 123 (for example, a graphic processing device, an image signal processor, a sensor hub processor, or a communication processor) which can operate independently of or together with the same. Additionally or alternately, the auxiliary processor 123 may be configured to consume less power than the main processor 121 or to be customized to a designated function. The auxiliary processor 123 may be implemented separately from or as a part of the main processor 121.

The auxiliary processor 123 may, for example, control at least some of functions or states related to at least one constituent element (for example, the display device 160, the sensor module 176, or the communication module 190) among the constituent elements of the electronic device 101 instead of the main processor 121 while the main processor 121 is in an inactive (for example, sleep) state or together with the main processor 121 while the main processor 121 is in an active (for example, executing an application) state. According to an embodiment, the auxiliary processor 123 (for example, an image signal processor or a communication processor) may be implemented as a part of another constituent element functionally related thereto (for example, the camera module 180 or the communication module 190).

The memory 130 may store various kinds of data used by at least one constituent element (for example, the processor 120 or the sensor module 176) of the electronic device 101. The data may include, for example, software (for example, a program 140) and input data or output data regarding a command related thereto. The memory 130 may include the volatile memory 132 and/or the nonvolatile memory 134.

The program 140 may be stored in the memory 130 as software, and may include, for example, an operating system 142, middleware 144, or an application 146.

The input device 150 may receive a command or data, which is to be used for a constituent element (for example, the processor 120) of the electronic device 101, from the outside (for example, the user) of the electronic device 101. The input device 150 may include, for example, a microphone, a mouse, a keyboard, or a digital pen (for example, a stylus pen).

The sound output device 155 may output a sound signal to the outside of the electronic device 101. The sound output device 155 may include, for example, a speaker or a receiver. The speaker may be used for a common usage such as multimedia playback or recording playback, and the receiver may be used to receive an incoming call. According to an embodiment, the receiver may be implemented separately from or as a part of the speaker.

The display device 160 may visually provide information to the outside (for example, the user) of the electronic device 101. The display device 160 may include, for example, a display, a hologram device, or a projector and a control circuit for controlling the corresponding device. According to an embodiment, the display 160 may include a touch circuitry configured to sense a touch, or a sensor circuit (for example, a pressure sensor) configured to measure the intensity of a force generated by the touch.

The audio module 170 may convert a sound into an electric signal or, inversely, convert an electric signal into a sound. According to an embodiment, the audio module 170 may acquire a sound through the input device 150, or may output a sound through the sound output device 155 or an external electronic device (for example, the electronic device 102 (for example, a speaker or a headphone)) connected to the electronic device 101 directly or wirelessly.

The sensor module 176 may sense the operating state (for example, power or temperature) of the electronic device 101 or the external environment state (for example, user state), and may generate an electric signal or a data value corresponding to the sensed state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or a luminance sensor.

The interface 177 may support one or more designated protocols that can be used to connect the electronic device 101 to an external electronic device (for example, the electronic device 102) directly or wirelessly. According to an embodiment, the interface 177 may include, for example, a high definition multimedia interface (HDMI), a universal serial bus (USB) interface, an SD card interface, or an audio interface.

A connection terminal 178 may include a connector through which the electronic device 101 can be connected to an external electronic device (for example, the electronic device 102) physically. According to an embodiment, the connection terminal 178 may include, for example, an HDMI connector, a USB connector, an SD card connector, or an audio connector (for example, a headphone connector).

The haptic module 179 may convert an electric signal into a mechanical stimulus (for example, vibration or movement) that the user can recognize through the tactile or kinesthetic sense, or an electric stimulus. According to an embodiment, the haptic module 179 may include, for example, a motor, a piezoelectric element, or an electric stimulus device.

The camera module 180 may take still and/or moving images. According to an embodiment, the camera module 180 may include one or more lenses, image sensors, image signal processors, or flashes.

The power management module 188 may manage power supplied to or consumed by the electronic device 101. According to an embodiment, the power management module 188 may be implemented as at least a part of a power management integrated circuit (PMIC), for example.

The battery 189 may supply power to at least one constituent element of the electronic device 101. According to an embodiment, the battery 189 may include a primary battery which is not rechargeable, and a second battery or a fuel cell, which is rechargeable.

The communication module 190 may support establishment of a direct (for example, wired) communication channel or a wireless communication channel between the electronic device 101 and an external electronic device (for example, the electronic device 102, the electronic device 104, or the server 108), and execution of communication through the established communication channel. The communication module 190 may include one or more communication processors which operate independently of the processor 120 (for example, an application processor) and which support direct (for example, wired) communication or wireless communication. According to an embodiment, the communication module 190 may include a wireless communication module 192 (for example, a cellular communication module, a short-distance wireless communication module, or a global navigation satellite system (GNSS) communication module) or a wired communication module 194 (for example, a local area network (LAN) communication module or a power line communication module). Among these communication modules, the corresponding communication module may communicate with an external electronic device through a first network 198 (for example, a short-distance communication network such as Bluetooth, Wi-Fi direct, or infrared data association (IrDA)) or through a second network 199 (for example, a long-distance communication network such as a cellular network, the Internet, or a computer network (for example, a LAN or a WAN)). Such various kinds of communication modules may be integrated into a single constituent element (for example, a single chip) or may be implemented as separate multiple constituent elements (for example, multiple chips). The wireless communication module 192 may confirm and authenticate the electronic device 101 inside a communication network, such as the first network 198 or the second network 199, by using subscriber information (for example, international mobile subscriber identity (IMSI)) stored in the subscriber identification module 196.

The antenna module 197 may transmit a signal or power to the outside (for example, an external electronic device) or receive the same from the outside. According to an embodiment, the antenna module 197 may include one antenna including a radiator made of a conductor or a conductive pattern formed on a substrate (for example, a PCB). According to an embodiment, the antenna module 197 may include one or more antennas. In this case, at least one antenna appropriate for a communication scheme used by a communication network, such as the first network 198 or the second network 199, may be selected from the multiple antennas by the communication module 190, for example. A signal or power may be transmitted or received between the communication module 190 and the external electronic device through the at least one selected antenna. According to some embodiments, a component (for example, RFIC) other than the radiator may be additionally formed as a part of the antenna module 197.

At least some of the above constituent elements may be connected to each other through a communication scheme (for example, a bus, a general purpose input and output (GPIO), a serial peripheral interface (SPI), or a mobile industry processor interface (MIPI)) between peripheral devices, and may exchange a signal (for example, a command or data) between each other.

According to an embodiment, a command or data may be transmitted or received between the electronic device 101 and the external electronic device 104 through the server 108 connected to the second network 199. Each of the electronic devices 102 and 104 may be of the same type as or of a different type from the electronic device 101. According to an embodiment, all or some of operations performed by the electronic device 101 may be performed by more than one external electronic device among the external electronic devices 102, 104, or 108. For example, when the electronic device 101 needs to execute a specific function or service automatically or in response to a request of the user or another device, the electronic device 101 may request one or more external electronic devices to execute at least a part of the function or service instead of or in addition to independently executing the function or service. One or more external electronic devices, which received the request, may execute at least a part of the requested function or service, or an additional function or service related to the request, and may transfer the result of executing the same to the electronic device 101. The electronic device 101 may provide the result, without any change or after additionally processing the same, as at least a part of a response to the request. To this end, for example, cloud computing, distributed computing, or client-server computing technology may be used.

Figure 2:
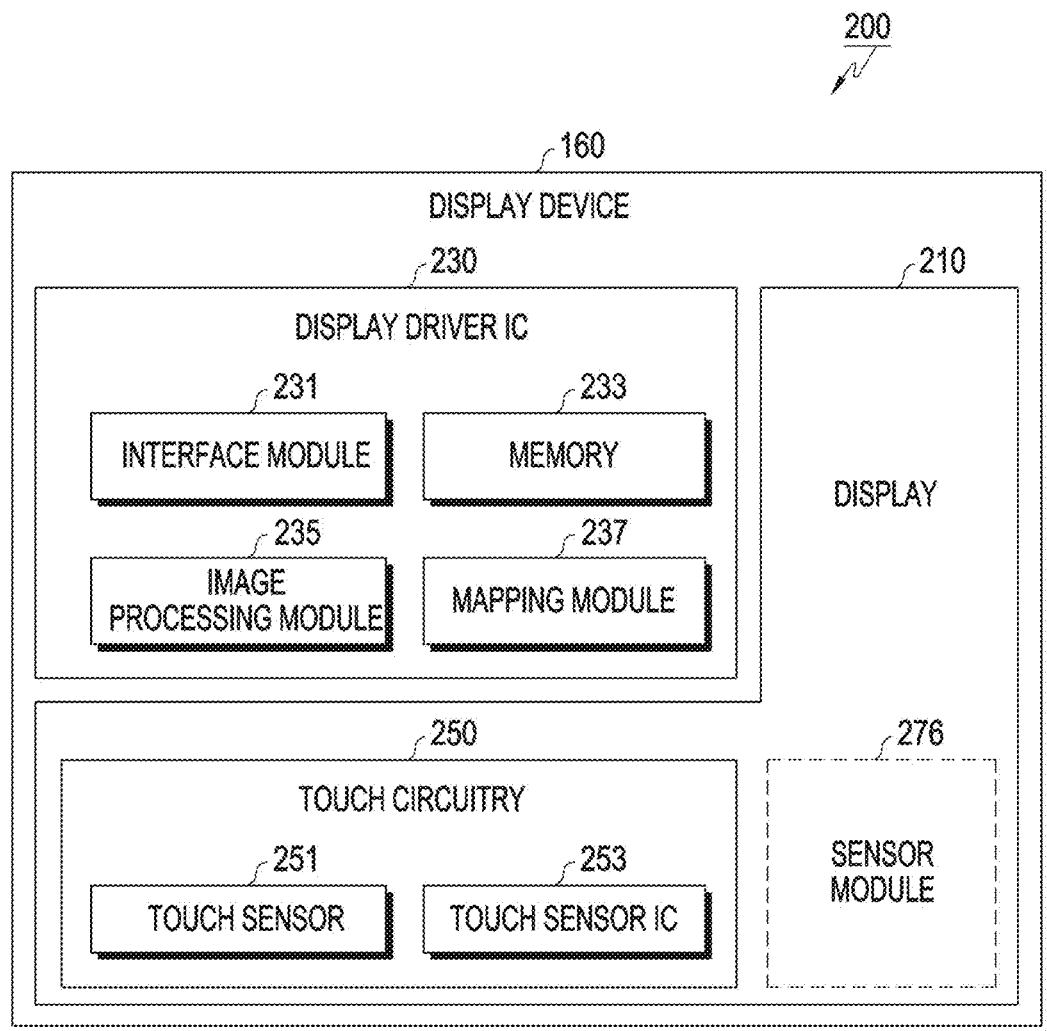
FIG. 2 is a block diagram illustrating a display device according to an embodiment of the disclosure.

FIG. 2 is a block diagram illustrating a display device according to an embodiment of the disclosure.

Referring to FIG. 2, the display device 160 of block diagram 200 may include a display 210 and a display driver IC (DDI) 230 for controlling the same. The DDI 230 may include an interface module 231, a memory 233 (for example, a buffer memory), an image processing module 235, or a mapping module 237. The DDI 230 may receive image data or image information including an image control signal corresponding to a command for controlling the image data from another constituent element of the electronic device 101 through the interface module 231. For example, according to an embodiment, the image information may be received from the processor 220 (for example, the main processor 121 (for example, an application processor) or the auxiliary processor 123 (for example, a graphic processing device) operating separately from the function of the main processor 121). The DDI 230 may communicate with touch circuitry 250 or sensor module 276, for example, through the interface module 231. In addition, the DDI 230 may store at least a part of the received image information in the memory 233 frame by frame, for example. The image processing module 235 may conduct pre-processing or post-processing (for example, adjusting the resolution, brightness, or size) of at least a part of the image data, for example, at least on the basis of the characteristics of the image data or the characteristics of the display 210. The mapping module 237 may generate a voltage value or a current value corresponding to the image data, which has been pre-processed or post-processed by the image processing module 235. According to an embodiment, the voltage value or current value may be generated, for example, at least partially on the basis of the attribute of pixels of the display 210 (for example, the arrangement of pixels (RGB stripe or pentile structure), or the size of each sub-pixel). At least some pixels of the display 210 may be driven at least on the basis of the voltage value or current value, for example, such that visual information (for example, a text, an image, or an icon) corresponding to the image data may be displayed through the display 210.

According to an embodiment, the display device 160 may further include the touch circuitry 250. The touch circuitry 250 may include a touch sensor 251 and a touch sensor IC 253 for controlling the same. The touch sensor IC 253 may control the touch sensor 251 so as to sense a touch input or a hovering input, for example, with regard to a specific position on the display 210. For example, the touch sensor IC 253 may sense a touch input or a hovering input by measuring the change of a signal (for example, voltage, amount of light, resistance, or amount of electric charge) with regard to a specific position on the display 210. The touch sensor IC 253 may provide the processor 220 with information (for example, position, area, pressure, or time) regarding the sensed touch input or hovering input. According to an embodiment, at least a part (for example, the touch sensor IC 253) of the touch circuitry 250 may be included as a part of the display driver IC 230 or the display 210, or as a part of another constituent element (for example, the auxiliary processor 123) arranged outside the display device 160.

According to an embodiment, the display device 160 may further include at least one sensor (for example, a fingerprint sensor, an iris sensor, a pressure sensor, or a luminance sensor) of the sensor module 276, or a control circuit related thereto. In this case, the at least one sensor or the control circuit related thereto may be embedded in a part (for example, the display 210 or the DDI 230) of the display device 160 or in a part of the touch circuitry 250. For example, when the sensor module 276 embedded in the display device 160 includes a biometric sensor (for example, a fingerprint sensor), the biometric sensor may acquire biometric information (for example, a fingerprint image) related to a touch input through a partial area of the display 210. As another example, when the sensor module 276 embedded in the display 160 includes a pressure sensor, the pressure sensor may acquire pressure information related to a touch input through a partial area of the display 210 or through the entire area thereof. According to an embodiment, the touch sensor 251 or the sensor module 276 may be arranged between pixels of a pixel layer of the display 210, or above or below the pixel layer.

Hereinafter, an electronic device 101 according to various embodiments will be described with reference to the accompanying drawings.

Figure 3:
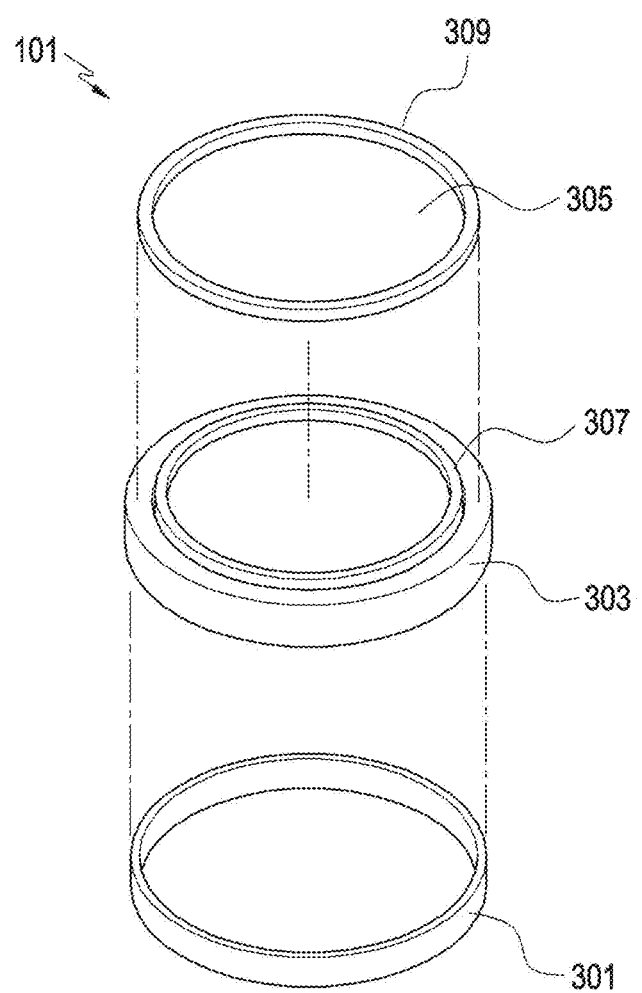
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 101 according to various embodiments may include a housing 301, a rotatable member 303, a display 305 (similar or identical to the display device 160 of FIG. 1 or to the display 210 of FIG.

2), a first coupling member 307, and a second coupling member 309. The first coupling member 307 may protrude from each of the upper and lower sides of the rotatable member 303. The housing 301 may be coupled to the rotatable member 303 by using the first coupling member 307 (for example, the downwardly protruding part). For example, at least a part of the first coupling member 307 (for example, the downwardly protruding part) may be inserted into the housing 301. The rotatable member 303 may be arranged such that the same can rotate while surrounding at least a part of the first coupling member 307. In an embodiment, the rotatable member 303 may have a ring shape, and may include a ring member such that the same can be mounted on the front surface of the housing 301 and can rotate clockwise or counterclockwise. The display 305 may be coupled to the rotatable member 303 by using the first coupling member 307 (for example, the upwardly protruding part) and the second coupling member 309. For example, at least a part of the first coupling member 307 (for example, the upwardly protruding part) may be inserted into the second coupling member 309. In an embodiment, the rotatable member 303 may be arranged on the periphery of the display 305 through the second coupling member 309.

Referring to FIG. 1, FIG. 2, and FIG. 3, the electronic device 101 according to various embodiments may contain the processor 120, the memory 130, the communication module 190, or various kinds of other electronic components inside the housing 301.

The processor 120 according to various embodiments may control the display 305 so as to display a first group including at least one object corresponding to at least one basic function on the screen of the display 305. In addition, the processor 120 may select at least one additional function related to the user or the electronic device 101 in order to additionally recommend a function to the user together with the at least one basic function in response to occurrence of a specific event and may conduct a control such that a second group including at least one object corresponding to at least one selected additional function is displayed on the screen of the display 305 together with the first group. The second group may be displayed on the screen so as not to overlap the first group. The specific event may be at least one event selected from user recognition, a touch input by the rotatable member 303, information reception or reservation notification, mounting on or interworking with an external device, and user input information reception.

According to various embodiments, the processor 120 may control the display 305 so as to display supplementary information on the screen, such as detailed information related to the basic function or the additional function, notification information, or the current time, together with the first group or with the first group and the second group. The supplementary information may be displayed in an area that does not overlap the area in which the first group or the first and second groups are displayed.

According to various embodiments, the processor 120 may control the display such that, when the rotatable member 303 rotates clockwise or counterclockwise, an indicator (for example, a cursor) is displayed on the screen so as to move between the displayed objects in response to the rotation. The indicator may be displayed to exhibit a visual effect such as highlighting, displaying with a different color, or light blinking. In addition, the indicator may be displayed so as to overlap or to be adjacent to an object indicated so as to correspond to the position of a reference line (or point) displayed on a part of the front surface of the rotatable member 303 (side surface thereof coupled to the display 305), for example.

According to various embodiments, when a designated time elapses after the rotatable member 303 has stopped rotating, the processor 120 may select a function corresponding to the object indicated by the indicator, and may execute the selected function. In addition, if an event (for example, a second event) such as termination of execution of the selected function occurs, or if the specific event (for example, first event) does not occur during a designated time while the second group is displayed, the processor 120 may conduct a control such that the state prior to display of the second group is revisited, and the first group is solely displayed. According to various embodiments, if the specific event (for example, first event) does not occur for a designated time while the first group or the first and second groups are displayed, the processor 120 may switch to a standby state or to a state in which the display 305 is deactivated.

According to various embodiments, the processor 120 may select or newly generate an additional function to be recommended to the user, on the basis of at least one selected from context information acquired from at least one of the input device 150, the camera module 180, the communication module 190, or the sensor module 176; service information provided by an external device ($3^{rd}$ party); and sensing information.

According to various embodiments, the processor 120 may recognize a user on the basis of information acquired from a sensor module (for example, the sensor module 176 of FIG. 1, the sensor module 276 of FIG. 2, or the touch sensor 251), a camera module (for example, the camera module 180 of FIG. 1), or a speech recognition module, and may provide a different additional function with regard to each recognized user.

The processor 120 according to various embodiments may be a hardware module or a software module (for example, an application program), and may include, for example, one or a combination of at least two of hardware, software, and firmware.

The memory 130 according to various embodiments may store instructions related to the overall operation performed by the processor 120 of the electronic device 101.

The communication module 190 may conduct wired or wireless communication with an external device (for example, the electronic device 102 or 104 of FIG. 1) or the server 108. The communication module 190 may receive context information from the external device or receive service information provided by another external device ($3^{rd}$ party) and may transfer the received information to the processor 120.

The electronic device 101 according to various embodiments may be configured such that a sensor module 176 including at least one sensor is arranged outside the rotatable member 303. The sensor module 176 may include a rotation sensing sensor for sensing the rotation of the rotatable member 303 and a touch sensor or a pressure sensor for sensing the position of the user's hand and may also include various kinds of sensors necessary for operations. According to various embodiments, the sensor module 176 may be arranged inside the housing 301.

The electronic device 101 according to various embodiments may be configured such that the device 101 can be attached to/detached from an external electronic device (for example, the electronic device 102 or 103 of FIG. 1), may receive functions provided by the external electronic device to which the device 101 is attached by using the communication module 190, may select a basic function or an additional function from the received functions, and may provide the selected function.

The electronic device 101 according to various embodiments may combine provided functions, thereby generating a new function, and may select the generated function as a basic function or an additional function.

As such, major constituent elements of the electronic device 101 according to various embodiments have been described. However, according to various embodiments, not all of the constituent elements illustrated in FIG. 1, FIG. 2, and FIG. 3 are essential constituent elements, and the electronic device 101 may be implemented by a larger number of constituent elements than those illustrated or by a smaller number of constituent elements than those illustrated. In addition, the positions of the major constituent elements of the electronic device 101 described above with reference to FIG. 1, FIG. 2, and FIG. 3 may be changed according to various embodiments.

Figures 4A, 4B, 4C:
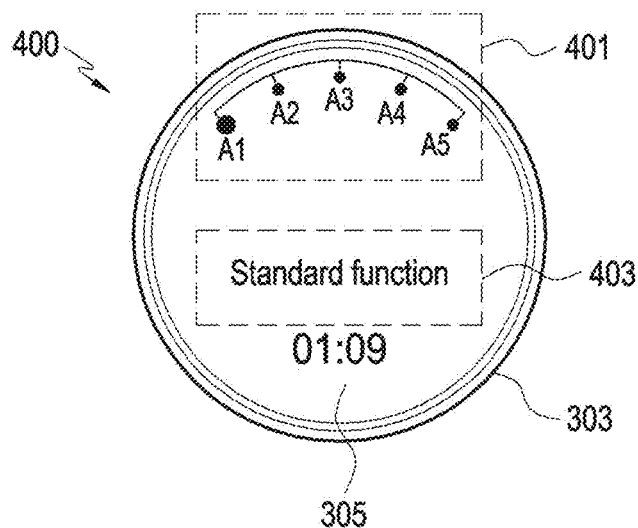
FIGS. 4A, 4B, and 4C are diagrams illustrating screens displayed on a display of an electronic device according to various embodiments of the disclosure.

FIGS. 4A, 4B, and 4C are diagrams illustrating screens displayed on a display of an electronic device according to various embodiments of the disclosure.

Referring to FIG. 1 and FIG. 4A, the processor 120 of the electronic device 101 may conduct a control such that when input information is received from the user or user recognition the display 305 is activated, and a first group 401 including objects A1, A2, A3, A4, and A5 corresponding to basic functions provided by the electronic device 101 is displayed on screen 400 of the display 305. The processor 120 may conduct a control such that supplementary information 303, such as detailed information regarding at least one of the objects, notification information, or reception information, is displayed on the screen on which the first group 401 is displayed without overlapping the first group 401. According to various embodiments, the processor 120 may conduct a control such that, when the display 305 is activated and is in an initial state, an indicator that indicates selection of the first object A1 from the objects A1, A2, A3, A4, and A5 is displayed so as to overlap or to be adjacent to the first object A1. In addition, the processor 120 may conduct a control such that an explanation of the first object A1, that is, detailed information 403 (for example, "Standard function") may be displayed on the screen as supplementary information 303. According to various embodiments, the processor 120 may output the supplementary information through at least one of the sound output device 155, the audio module 170, the haptic module 179, or the communication module 190.

According to various embodiments, when the objects A1, A2, A3, A4, and A5 are arranged on the screen, the processor 120 may arrange the existing objects A1, A2, A3, A4, and A5 from left to right or from right to left with reference to the direction of the user's view, for example, on the basis of at least one of the degree of importance, the number of usages, information regarding the sensed position of the user's hand, or a previously executed function. The basic function may be a default function or may be replaced with other functions depending on the context.

Referring to FIG. 4B and FIG. 4C, according to various embodiments, the processor 120 may differently configure the number and type of functions selected as basic functions from the functions provided by the electronic device 101, according to each user or according of the number of times the same are used for a predetermined period of time. According to various embodiments, when the electronic device 101 provides functions A to M as illustrated in FIG. 4B, the processor 120 may acquire information regarding the number of times respective functions are used, and may select, as basic functions, functions H, G, L, K, and C, in the order of the largest number of usages, from the functions A to M. In addition, according to various embodiments, the processor 120 may acquire information regarding the number of usages with regard to user A and user B, respectively, as illustrated in FIG. 4C, and may differently select functions in the order of the largest number of usages with regard to respective users. For example, functions H, G, L, K, and C may be selected as basic functions in the case of user A, and functions I, H, C, B, and A may be selected as basic functions in the case of user B.

According to various embodiments, the processor 120 may differently configure the type, number, or display position of the basic functions according to context information (for example, weather or time). For example, when the electronic device 101 provides a washing-related function, and when the current weather is wintry, the processor 120 may select, as a basic function, at least one function from a function related to characteristics of garments worn in winter, a function frequently used in the last winter, a function for providing warm water, and a function for preventing freezing and bursting of pipes, and may select the same to be different from the default function or from the basic function provided in summer.

FIGS. 5A, 5B, 5C, and 5D are diagrams further illustrating screens displayed on a display of an electronic device according to various embodiments of the disclosure.

Figure 5A:
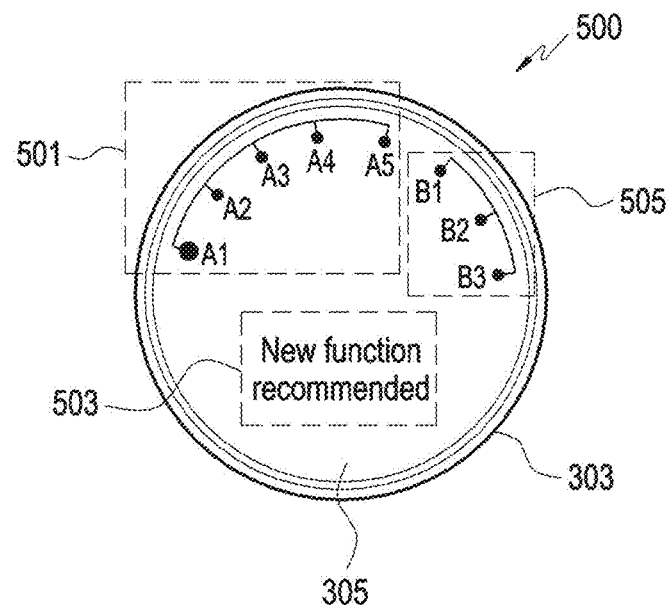
FIGS. 5A, 5B, 5C, and 5D are diagrams further illustrating screens displayed on a display of an electronic device according to various embodiments of the disclosure.

Referring to FIG. 1 and FIG. 5A, if a specific event occurs while a first group 501 is displayed on screen 500 of the display 305, the processor 120 of the electronic device 101 according to various embodiments may provide functions to be additionally recommended to the user. The processor 120 may select or generate at least one additional function related to the user or the electronic device, in response to occurrence of the specific event. The processor 120 may control the display so as to display a second group 505 including at least one object corresponding to the at least one selected or generated additional function, on the screen together with the first group. The second group 505 may be separately displayed in an area adjacent to the position in which the first group 501 is displayed, without overlapping the first group. For example, if the display 305 is configured in a ring shape, the first group 501 and the second group 505 may be displayed in an area adjacent to the periphery of the ring shape such that the user can easily notice selection of a displayed object in response to a rotation of the rotatable member 303. When the second group is displayed, the first group may be displayed on the screen in a changed display position.

According to various embodiments, the processor 120 may keep displaying the first group 501 and the second group 505 for a designated time or as long as there is no user manipulation. After the designated time has elapsed, or if a specific function is selected and executed, the processor 120 may return to the state in which the first group 501 is displayed, as illustrated in FIG. 4A, or switch to a standby state. According to various embodiments, if the function has not been completely executed, or if there is no separate request of the user, the processor 120 may keep displaying the first group 501 and the second group 505 as illustrated in FIG. 5A, instead of returning to the previous state.

According to various embodiments, the processor 120 may make reselection every time the specific event occurs (for example, activation of the display 305), for each predetermined period of time (for example, day, week, month, year, or season), or every time function-related information is received from an external device.

According to various embodiments, the processor 120 may conduct a control such that, when the first group 501 and the second group 505 are displayed, supplementary information 503 is displayed so as to inform that a new additional function can be selected.

Figure 5B:
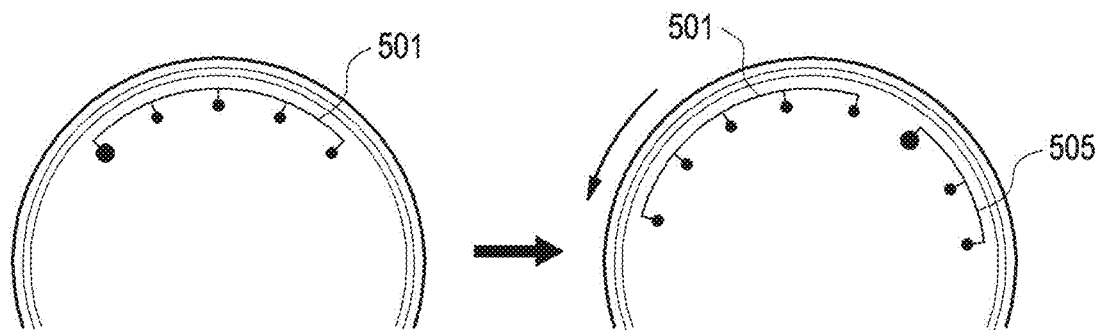

Referring to FIG. 5B, according to various embodiments, when the second group 505 is displayed, the processor 120 may move an indicator that indicates an object included in the first group 501 such that the indicator indicates the first object B1 included in the second group 505. The indicator may be displayed so as to overlap or to be adjacent to the first object B1 included in the second group 505.

Figure 5C:
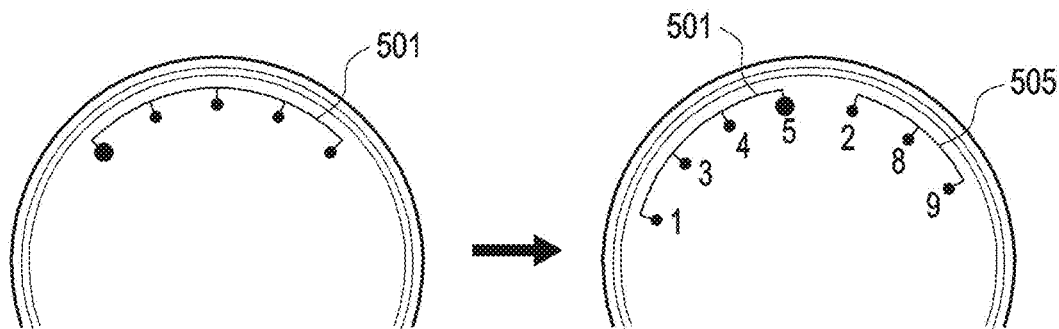

Referring to FIG. 5C, according to various embodiments, the processor 120 may conduct a control such that, when the second group 505 including the additional functions 2, 8, and 9 is displayed, and if the second group 505 includes functions identical or similar to the basic functions 1, 2, 3, 4, and 5, the object corresponding to the identical or similar basic function 2 is removed from the first group 501, and the object corresponding to the basic function 2 is included in the second group 505.

Figure 5D:
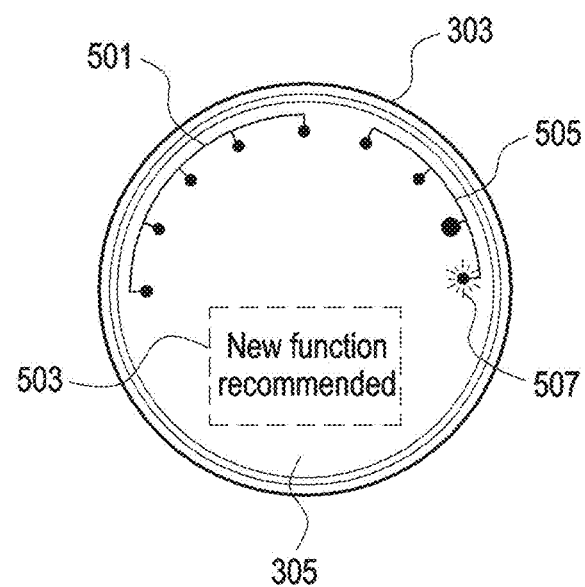

Referring to FIG. 5D, according to various embodiments, the processor 120 may control the display 305 such that, when a new additional function is added while the second group 505 is displayed, the second group 505, which includes an object 507 corresponding to the new additional function, is expanded and displayed. The newly added object 507 is of a reaction-type expansion structure type, and may provide the user with a visual effect (for example, an animation informing that a new function has been added, or a motion effect for enabling intuitive recognition of generation of the corresponding additional function). According to various embodiments, the processor 120 may control inclusion and display such that, if the new additional function is a function newly generated by service information provided by an external device, the object 507 corresponding to the new additional function is included in a separate third group and displayed separately from the second group 505.

An electronic device according to various embodiments (for example, the electronic device 101) may include a housing, a rotatable member rotatably arranged outside of a part of the housing, a display exposed through a part of a front surface of the housing, a memory arranged inside the housing, and at least one processor arranged inside the housing so as to be connected to the display and the memory electrically or functionally. The memory may be configured to store instructions that, when executed, cause the at least one processor to control the display to display a first group including at least one object corresponding to at least one basic function on a screen of the display, and control the display to display a second group including at least one object corresponding to at least one additional function related to a user or the electronic device, together with the first group, on the screen in response to occurrence of an event.

According to various embodiments, the instructions may be configured to cause the processor to control the display, when the rotatable member is rotated, so as to display an indicator moving between the displayed objects on the screen in response to the rotation, identify a function corresponding to an object displayed in an area in which the indicator is positioned, and execute the identified function.

According to various embodiments, the instructions may be configured to cause the processor to control the display so as to display supplementary information related to the identified function on the screen.

According to various embodiments, the instructions may be configured to cause the processor to recognize a user when the processor controls the display so as to display the first group and to select the at least one basic function for the recognized user from functions provided by the electronic device. The at least one basic function is different with regard to each user.

According to various embodiments, the instructions may be configured to cause the processor to select the at least one basic function on the basis of the number of times respective functions provided by the electronic device are used, when the processor controls the display so as to display the first group.

According to various embodiments, the instructions may be configured to cause the processor to control the display, when displaying the second group, so as to change a display position of the first group such that the object related to the at least one additional function is not overlapped, and to display supplementary information related to the additional function on the display.

According to various embodiments, the instructions may be configured to cause the processor to acquire context information and to determine the number and display position of the at least one basic function on the basis of the acquired context information.

According to various embodiments, the instructions may be configured to cause the processor to control the display so as to return to a display state prior to display of the second group when a second event occurs while the first group is displayed.

According to various embodiments, the instructions may be configured to cause the processor to acquire context information in response to occurrence of the first event, select the at least one additional function from functions provided by the electronic device on the basis of the acquired context information, or select a new function by combining the provided functions as needed, and control the display so as to display a second group including the at least one object related to the at least one selected additional function, together with the first group.

According to various embodiments, the instructions may be configured to cause the processor to receive information regarding a service provided by an external device by using a communication module or an input interface, generate at least one new recommended function on the basis of the received information regarding a service, and control the display so as to display an object related to the generated new recommended function on the screen.

According to various embodiments, the instructions may be configured to cause the processor to sense a position of a hand of a user by using at least one sensor, identify an area on the screen corresponding to the sensed position of the hand, and change display positions of the first group and the second group to a different area facing the identified area.

According to various embodiments, the instructions may be configured to cause the processor to identify a horizontal position to which a line of sight of a user is directed with reference to a position in which the display of the electronic device is arranged, when the electronic device interworks with or is electrically connected to an external electronic device, and change a display position of at least one of the first group, the second group, or supplementary information on the screen on the basis of the identified horizontal position.

According to various embodiments, the instructions may be configured to cause the processor to control the display so as to display, on the screen, at least one object corresponding to at least one hidden function when the rotatable member is rotated toward a first direction at or above a designated rate of rotation, and control the display such that the at least one object corresponding to the at least one hidden function disappears from the screen when the rotatable member rotates toward a second direction that is opposite to the first direction.

According to various embodiments, the instructions may be configured to cause the processor to move an indicator such that a jump between groups is possible when the rotatable member is rotated at or above a designated rate and to change a display position of the indicator so as to indicate an object displayed in a position to which the indicator is moved.

An operating procedure in the above-described electronic device will be described in detail with reference to the accompanying drawings.

Figure 6:
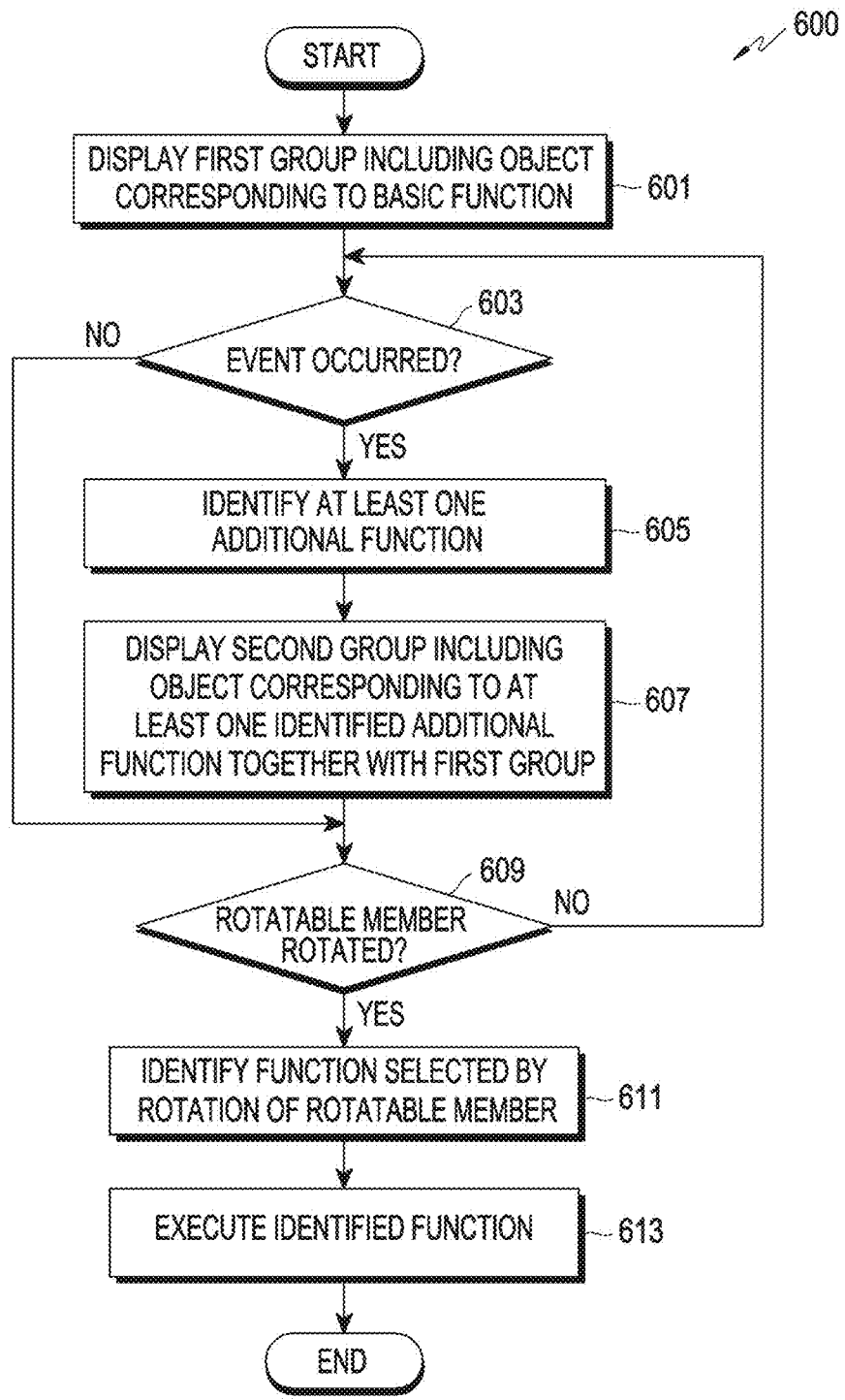
FIG. 6 is a flowchart of an operating procedure of an electronic device according to an embodiment of the disclosure.

FIG. 6 is a flowchart of an operating procedure of an electronic device according to an embodiment of the disclosure.

FIGS. 7A, 7B, 7C, 7D, 7E, and 7F are diagrams illustrating screens related to an operating procedure of an electronic device according to various embodiments of the disclosure.

Referring to FIG. 6 and FIGS. 7A, 7B, 7C, 7D, 7E, and 7F, the electronic device (the electronic device 101 of FIG. 1 or the electronic device 101 of FIG. 3) according to various embodiments may display, in operation 601 of flowchart 600, a first group 701 including at least one object A1, A2, A3, A4, or A5 corresponding to at least one basic function on screen 700 of the display 305 (for example, similar or identical to the display 160 of FIG. 1 or the display 210 of FIG. 2), as illustrated in FIG. 7A. According to various embodiments, as the rotatable member 303 moves clockwise as illustrated at 711 in FIG. 7B, the electronic device may move the indicator, which indicates the first object A1 included in the first group 701, and may display the indicator so as to indicate the second object A2 included in the first group 701. The indicator may be moved between respective objects A1, A2, A3, A4, and A5 included in the first group 701, and may indicate selection of the object displayed in the position to which the same is moved.

In operation 603, the electronic device may confirm whether a specific event has occurred while the first group is displayed. The electronic device may perform operation 605 when it is confirmed that the specific event has occurred and may perform operation 609 when it is confirmed that the specific event has not occurred. If no rotation of the rotatable member 303 is confirmed, the electronic device may proceed to perform operation 609.

In operation 605, the electronic device may identify at least one additional function related to the user or the electronic device 101, in order to additionally recommend a function to the user together with the at least one basic function, in response to occurrence of the specific event. According to various embodiments, the at least one additional function may be selected from functions provided by the electronic device on the basis of at least one selected from user recognition, the number of usages, context information, and information acquired through interworking with an external electronic device. According to various embodiments, in connection with the at least one additional function, a new additional function may be generated on the basis of service information or context information provided by an external device.

In operation 607, the electronic device may generate a second group 703 including at least one object corresponding to the at least one identified additional function and may display the second group 703 including at least one object B1, B2, or B3 on the screen of the display 305, as illustrated in FIG. 7C.

In operation 609, the electronic device may confirm whether the rotatable member 303 has rotated. According to various embodiments, the electronic device may confirm whether the rotatable member 303 is rotating in a first direction (for example, clockwise) as in FIG. 7B and FIG. 7D.

When it is confirmed in operation 609 that the rotatable member 303 is rotated, the electronic device may, in operation 611, identify the position in which the rotation of the rotatable member 303 has ended and may identify a function corresponding to the object displayed in the identified position. The identified function is a function selected by the rotation of the rotatable member 303. The electronic device may move the indicator according to the rotation of the rotatable member 303 and may display the indicator so as to indicate the object corresponding to the selected function. As the rotatable member 303 further rotates in the first direction (for example, clockwise) as illustrated at 712 in FIG. 7D, the electronic device may display the indicator, which indicates the fifth object A5 included in the first group 701, such that the indicator indicates the first object B1 included in the second group 701.

In operation 613, the electronic device may execute the identified function. The electronic device may automatically execute the identified function if another event does not occur for a designated time. According to various embodiments, the electronic device may display information related to the executed function, as supplementary information, in a display position that does not overlap the first group 701 and the second group 703. According to various embodiments, the electronic device may display information indicating that the identified function has been selected, as the supplementary information. The supplementary information may include an object that enables a user interface for receiving a confirmation from the user regarding whether or not to select the identified function. Accordingly, the electronic device may execute the identified function as the user selects the object that enables a user interface displayed on the screen.

According to various embodiments, if an event (for example, second event) such as termination of execution of the selected function occurs, or if the specific event (for example, the first event) does not occur for a designated time while the second group is displayed, the electronic device may return to the state prior to display of the second group 703 and may display only the first group 701. According to various embodiments, if the specific event (for example, the first event) does not occur for a designated time while the first group 701 or the first group 701 and the second group 703 are displayed, the electronic device may switch to a standby state or to a state in which the display 305 is deactivated.

According to various embodiments, the electronic device may select or generate a new additional function to be recommended to the user on the basis of at least one of context information, service information provided by an external device ($3^{rd}$ party), or sensing information, after operation 607 or operation 613 of FIG. 6, and may expand and display an object B4 corresponding to the selected or generated new additional function in the second group 705, as illustrated in FIG. 7E. In addition, the electronic device may display an object C1 or C2 corresponding to the at least one selected or generated additional function such that the same is included in a new third group 705 and displayed separately from the second group, as illustrated in FIG. 7F. According to various embodiments, the electronic device may display an indicator that indicates the object corresponding to the most preferentially recommended function among the objects included in the second group or the third group, or may display a visual expression for highlighting the object.

Figure 8:
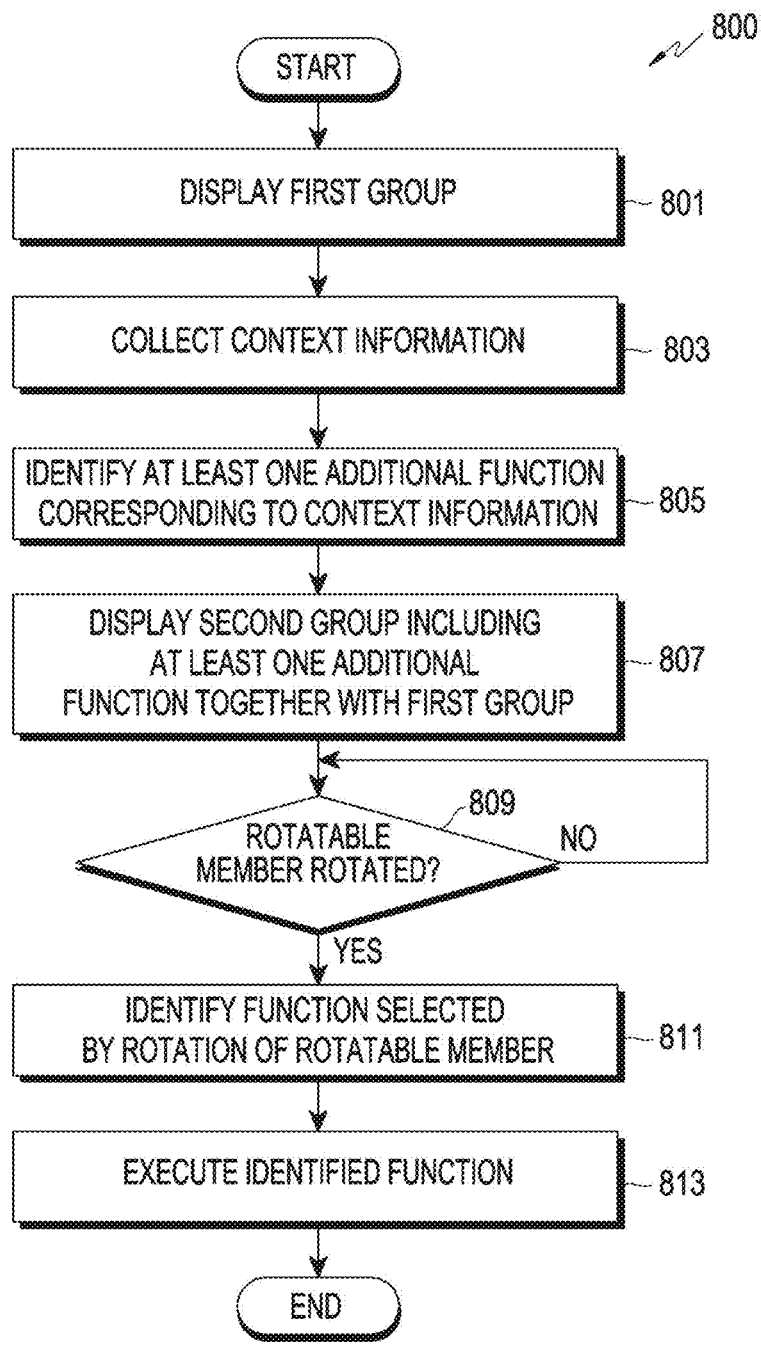
FIG. 8 is another flowchart of an operating procedure of an electronic device according to an embodiment of the disclosure.

FIG. 8 is another flowchart of an operating procedure of an electronic device according to an embodiment of the disclosure.

FIGS. 9A, 9B, 9C, 9D, and 9E are diagrams further illustrating screens related to an operating procedure of an electronic device according to various embodiments of the disclosure.

Figure 9:
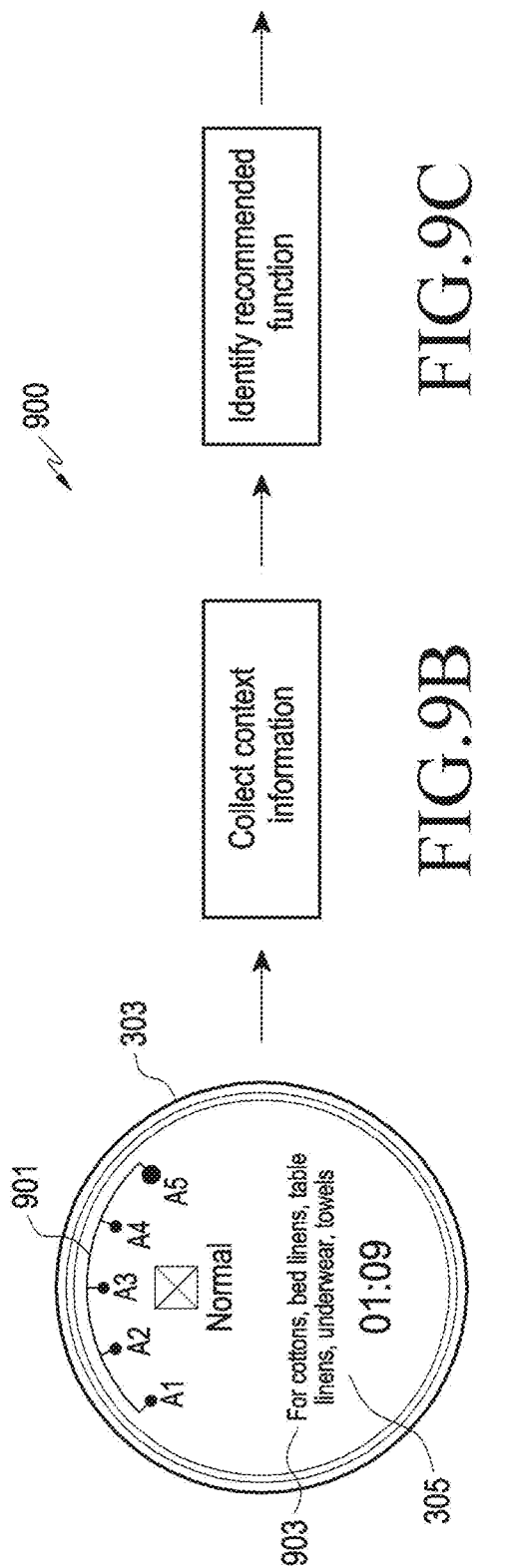
FIGS. 9A, 9B, 9C, 9D, and 9E are diagrams further illustrating screens related to an operating procedure of an electronic device according to various embodiments of the disclosure.

Referring to FIG. 8 and FIGS. 9A, 9B, 9C, 9D, and 9E, the electronic device (the electronic device 101 of FIG. 1 or the electronic device 101 of FIG. 3) according to various embodiments may display, in operation 801 of flowchart 800, a first group 901 including at least one object A1, A2, A3, A4, or A5 corresponding to at least one basic function on screen 900 of the display 305 (for example, similar or identical to the display 160 of FIG. 1 or the display 210 of FIG. 2), as illustrated in FIG. 9A. According to various embodiments, the electronic device may display an indicator so as to indicate an object (for example, A5) corresponding to a function which has the largest number of usages, or which has a high degree of importance, among the objects A1, A2, A3, A4, and A5 included in the first group 901. According to various embodiments, as the rotatable member 303 moves in a first direction (for example, clockwise), the electronic device may move the indicator included in the first group 901 and may display the indicator so as to indicate the fifth object A5 included in the first group 901. The indicator may be moved between respective objects A1, A2, A3, A4, and A5 included in the first group 901, and may indicate selection of the object displayed in the position to which the same is moved. According to various embodiments, the electronic device may display detailed information (for example, information indicating "Normal" function) regarding the object A5 indicated by the indicator as illustrated in FIG. 9A, as supplementary information 903. The supplementary information 903 may be displayed in an area on the screen of the display 305, below the position in which the first group 901 is displayed, without overlapping the first group 901.

In operation 803, the electronic device may collect context information related to the user or the electronic device as illustrated in FIG. 9B.

In operation 805, the electronic device may identify at least one additional function on the basis of the collected context information as illustrated in FIG. 9C. According to various embodiments, the electronic device may select the at least one additional function, on the basis of the context information, from provided functions.

In operation 807, the electronic device may display a second group 905 including at least one object B1, B2, or B3 corresponding to the at least one additional function, together with the first group 901, on the screen of the display 305 as in FIG. 9D. According to various embodiments, the electronic device may display notification information 907, such as information indicating display of the second group (for example, "New function recommended") or information indicating the next operation (for example, "Please select a function"), in a popup window or in an area on the screen separately from the supplementary information 903.

In operation 809, the electronic device may confirm whether the rotatable member 303 is rotated. According to various embodiments, the electronic device may confirm whether the rotatable member 303 is rotating in a first direction (for example, clockwise) as illustrated in FIG. 9E.

When it is confirmed in operation 809 that the rotatable member 303 is not rotated, the electronic device may continuously perform operation 809. When the rotatable member 303 is rotated, the electronic device may, in operation 811, identify the position in which rotation of the rotatable member 303 has ended, and may identify a function corresponding to the object displayed in the identified position. The identified function is a function selected by the rotation of the rotatable member 303. As the rotatable member 303 rotates in the first direction (for example, clockwise) as illustrated in FIG. 9E, the electronic device may move and display the indicator, which indicates the fifth object A5 included in the first group 901, such that the indicator indicates the first object B1 included in the second group 905.

In operation 813, the electronic device may execute the identified function. The electronic device may automatically execute the identified function if another event does not occur for a designated time. According to various embodiments, the electronic device may display information related to the executed function, as supplementary information 903, in a display position on the screen, which does not overlap the first group 901 and the second group 905.

Context information collected by the above-described operation 803 of FIG. 8 and the operation as illustrated in FIG. 9B may be collected from a wearable device of the user, a mobile device, a healthcare device, a user input, a database managed by a server, a website visited by the user, or a weather- or position-based database. The context information may include history information related to the previous operation of the electronic device, information related to the currently performed operation, and information related to an operation to be performed in the future (for example, reservation information). The type of the context information may include at least one piece of information including the user's physical information (for example, height, weight, heart rate, eyesight, blood pressure, blood glucose, blood type, oxygen saturation, waist size, skin type, and allergy), information acquired through analysis and recognition of the user (for example, character, preferences, profiles, value systems, facial expressions, speaking habits, emotions, and writing styles), information regarding the user's interests (for example, information related to objects preferred by the user, such as hobbies, selection criteria, likability, pets, fashion, music, and places), the user's activities (for example, the number of walks, the amount of exercise, food eating, habits, purchases, reservations, payments, the amount of usages, playlists, call lists, schedule, and execution), the user's literary works (for example, writings, photos, moving images, SNS, transmitted email, transmitted messages, memos, voice information, and paintings), the user's possessions (for example, belongings, installed devices, device states, expendables, expiration dates, the amount of usages, and the remaining amount), the user's social relationships (for example, address books, telephone numbers, SNS followers, received messages, received email, positions of acquaintances, emotional conditions of acquaintances, birthdays of acquaintances, and particulars of dialogues), and peripheral environment information (for example, locations, places, landmarks, weather, temperature, humidity, luminance, air quality, noise, atmosphere, altitude, distance, and traffic situation).

Figure 10:
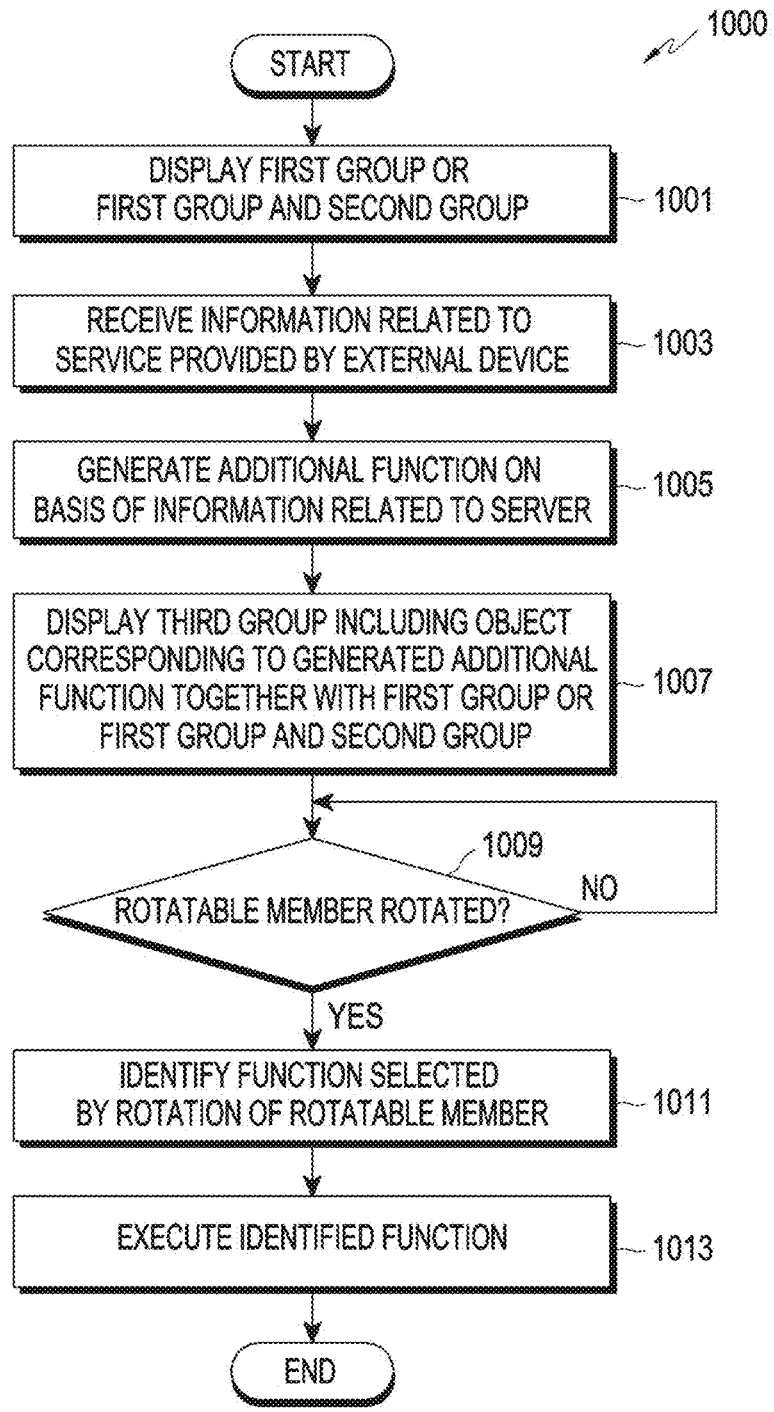
FIG. 10 is another flowchart of an operating procedure of an electronic device according to an embodiment of the disclosure.

FIG. 10 is another flowchart of an operating procedure of an electronic device according to an embodiment of the disclosure.

FIGS. 11A, 11B, 11C, 11D, and 11E are diagrams further illustrating screens related to an operating procedure of an electronic device according to various embodiments of the disclosure.

Figure 12:
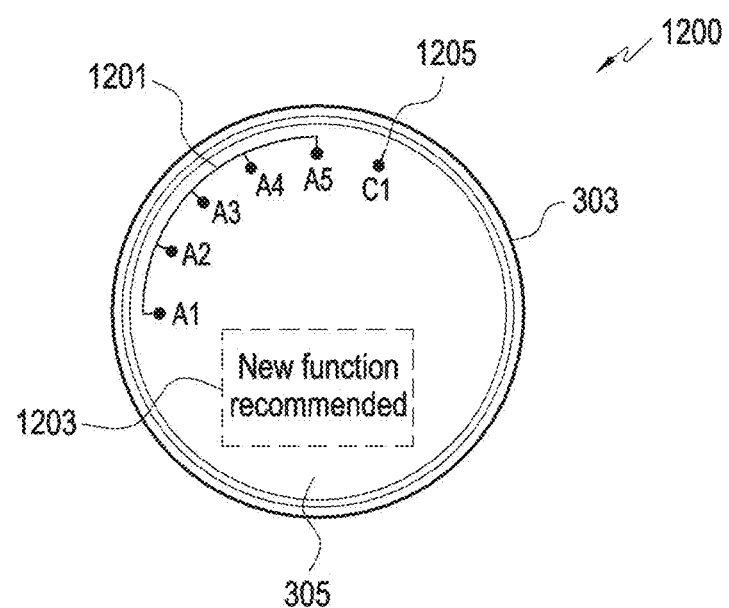
FIG. 12 is a diagram further illustrating a screen related to an operating procedure of an electronic device according to an embodiment of the disclosure.

FIG. 12 is a diagram further illustrating a screen related to an operating procedure of an electronic device according to an embodiment of the disclosure.

Referring to FIG. 10, FIGS. 11A, 11B, 11C, 11D, and 11E, and FIG. 12, the electronic device (the electronic device 101 of FIG. 1 or the electronic device 101 of FIG. 3) according to various embodiments may display, in operation 1001 of flowchart 1000, a first group 1101 including at least one object A1, A2, A3, A4, or A5 corresponding to at least one basic function on screen 1100 of the display 305 (for example, similar or identical to the display 160 of FIG. 1 or the display 210 of FIG. 2), as illustrated in FIG. 11A. According to various embodiments, the electronic device may display an indicator so as to indicate an object (for example, A5) corresponding to a function which has the largest number of usages, or which has a high degree of importance, or a designated first object A1 among the objects A1, A2, A3, A4, and A5 included in the first group 1101. According to various embodiments, as the rotatable member 303 moves in a first direction (for example, clockwise), the electronic device may move the indicator included in the first group 1101 and may display the indicator so as to indicate the fifth object A5 included in the first group 1101. The indicator may be moved between respective objects A1, A2, A3, A4, and A5 included in the first group 1101, and may indicate selection of the object displayed in the position to which the same is moved. According to various embodiments, the electronic device may display detailed information (for example, information indicating "Normal" function) regarding the object (for example, A5) indicated by the indicator as supplementary information 1103. The supplementary information 1103 may be displayed in an area on the screen of the display 305, below the position in which the first group 1101 is displayed, without overlapping the first group 1101.

In operation 1003, the electronic device may receive service information related to a service provided by an external device by means of the communication module (for example, the communication module 190 of FIG. 1) or a user input, as illustrated in FIG. 11B. The service information may include information regarding the type of a purchased product, the material (raw material) thereof, the characteristics thereof, or a related product, which is received from an external device on the basis of context information acquired through a purchase application, for example. In addition, the service information may include information received from an external device that provides a related service identified on the basis of the purchase information, information acquired through barcode or a QR code recognition, or the user's input information (for example, voice information).

In operation 1005, the electronic device may generate at least one additional function on the basis of the service information. According to various embodiments, when the electronic device operates on the basis of the operating procedure of FIG. 10, and, for example, when the electronic device interworks with or is mounted on a garment-related device (for example, a washing machine, a garment management device, or a drying machine), the electronic device may newly generate a recommended washing course as the additional function, as illustrated in FIG. 11C. The recommended washing course may be generated on the basis of service information (for example, information related to the characteristics of a purchased garment, the material thereof, management thereof, and the method for washing the same) provided by an external device (for example, a server device of the brand of the purchased garment).

In operation 1007, the electronic device may display a third group 1107 including at least one object C1 corresponding to the at least one generated additional function, as illustrated in FIG. 11D, on the screen of the display 305 together with the first group 1101 or the first group 1101 and a second group 1105. According to various embodiments, the electronic device may display supplementary information or may display notification information 1109, such as information indicating display of the third group 1107 (for example, "New function recommended") or information indicating the next operation (for example, "Please select a function"), in a popup window or in an area on the screen separately from the supplementary information 1003.

In operation 1009, the electronic device may confirm whether the rotatable member 303 is rotated. According to various embodiments, the electronic device may confirm whether the rotatable member 303 is rotating in a first direction (for example, clockwise).

When it is confirmed in operation 1009 that the rotatable member 303 is not rotated, the electronic device may continuously perform operation 1009. When the rotatable member 303 is rotated, the electronic device may, in operation 1011, identify the position in which rotation of the rotatable member 303 has ended, and may identify a function corresponding to the object displayed in the identified position. The identified function is a function selected by the rotation of the rotatable member 303. As the rotatable member 303 rotates in the first direction (for example, clockwise) as illustrated in FIG. 11E, the electronic device may move and display the indicator, which indicates an object (for example, A1) included in the first group 1101, such that the indicator indicates the first object C1 included in the third group 1107.

In operation 1013, the electronic device may execute the identified function. The electronic device may automatically execute the identified function if another event does not occur for a designated time. According to various embodiments, the electronic device may display information (for example, Gore-Tex from company A) related to the executed function, as supplementary information 1103, in a display position on the screen, which does not overlap the first group 1101, the second group 1103, and the third group 1107.

According to various embodiments, the electronic device may display on screen 1200 of the display 305 as illustrated in FIG. 12, a first group 1201 including objects A1, A2, A3, A4, and A5 corresponding to at least one basic function, may receive service information provided by the external device, may generate a new additional function, and may display a third group 1205 including an object C1 corresponding to the generated additional function so as not to overlap the first group 1201. The electronic device may display notification information 1203 indicating that the new additional function is recommended, in an area that does not overlap the first group 1201 and the third group 1205.

Figure 13:
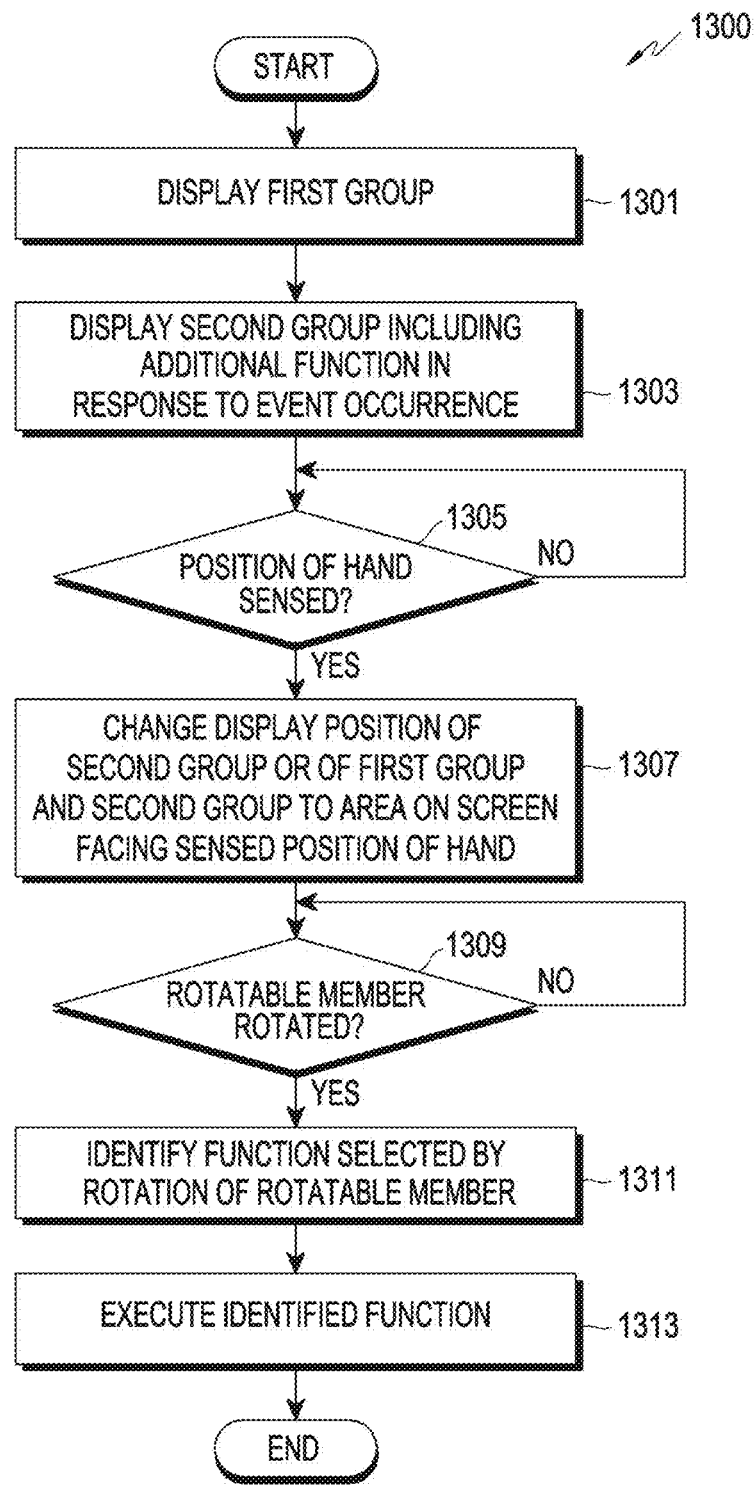
FIG. 13 is another flowchart of an operating procedure of an electronic device according to an embodiment of the disclosure.

FIG. 13 is another flowchart of an operating procedure of an electronic device according to an embodiment of the disclosure.

FIGS. 14A, 14B, 14C, and 14D are diagrams further illustrating screens related to an operating procedure of an electronic device according to various embodiments of the disclosure.

Referring to FIG. 13 and FIGS. 14A, 14B, 14C, and 14D, the electronic device (the electronic device 101 of FIG. 1 or the electronic device 101 of FIG. 3) according to various embodiments may display, in operation 1301 of flowchart 1300, a first group 1401 including at least one object A1, A2, A3, A4, or A5 corresponding to at least one basic function on screen 1400 of the display 305 (for example, similar or identical to the display 160 of FIG. 1 or the display 210 of FIG. 2), as illustrated in FIG. 14A. According to various embodiments, the electronic device may display an indicator so as to indicate an object (for example, fifth object A5) corresponding to a function which has the largest number of usages, or which has a high degree of importance, or a designated first object A1 among the objects A1, A2, A3, A4, and A5 included in the first group 1401. According to various embodiments, as the rotatable member 303 moves in a first direction (for example, clockwise), the electronic device may move the indicator included in the first group 1401 and may display the indicator so as to indicate the fifth object A5 included in the first group 1401. The indicator may be moved between respective objects A1, A2, A3, A4, and A5 included in the first group 1401, and may indicate selection of the object displayed in the position to which the same is moved. According to various embodiments, the electronic device may display detailed information (for example, information indicating "Convection Bake" function (for example, "Convection Bake description")) regarding the object (for example, A5) indicated by the indicator as supplementary information 1403. The supplementary information 1403 may be displayed in an area on the screen of the display 305, below the position in which the first group 1401 is displayed, without overlapping the first group 1401.

In operation 1303, the electronic device may display a second group 1405a including at least one object B1, B2, or B3 corresponding to the at least one additional function, together with the first group 1401, on the screen of the display 305 as illustrated in FIG. 14B. According to various embodiments, the electronic device may display notification information 1407, such as information displaying supplementary information 1403 or indicating display of the second group 1405a (for example, "New function recommended") or information indicating the next operation (for example, "Please select a function!"), in a popup window or in an area on the screen separately from the supplementary information 1403.

In operation 1305, the electronic device may confirm whether the position of the user's hand has been sensed. According to various embodiments, the electronic device may sense the positions 1409a, 1409b, and 1409c of the user's hand through a sensor arranged outside the rotatable member 303 or a sensor arranged on the display 305, as illustrated in FIG. 14C.

When it is confirmed in operation 1305 that the position of the hand has not been sensed, the electronic device may perform operation 1305 continuously and may perform operation 1307 when the position of the hand has been sensed.

In operation 1307, the electronic device may change the display position of the second group 1405a or of the first group 1401 and the second group 1405a to an area on the screen of the display 305, which faces the sensed position of the hand. According to various embodiments, the electronic device may display the first group 1401 and a second group 1405b in changed display positions, as illustrated in FIG. 14D.

In operation 1309, the electronic device may confirm whether the rotatable member 303 is rotated. According to various embodiments, the electronic device may confirm whether the rotatable member 303 is rotating in a first direction (for example, clockwise) or in a second direction (for example, counterclockwise).

When it is confirmed in operation 1309 that the rotatable member 303 is not rotated, the electronic device may continuously perform operation 1309. When the rotatable member 303 is rotated, the electronic device may, in operation 1311, identify the position in which rotation of the rotatable member 303 has ended, and may identify a function corresponding to the object displayed in the identified position. The identified function is a function selected by the rotation of the rotatable member 303. As the rotatable member 303 rotates in the second direction (for example, counterclockwise), the electronic device may move and display the indicator, which indicates an object (for example, A5) included in the first group 1401, such that the indicator indicates the first object B1 included in the second group 1405b.

In operation 1313, the electronic device may execute the identified function. The electronic device may automatically execute the identified function if another event does not occur for a designated time. According to various embodiments, the electronic device may display information related to the executed function as supplementary information 1403 on the screen in a display position which does not overlap the first group 1401 and the second group 1405a or 1405b and which is not covered by the sensed positions 1409a, 1409b, and 1409c of the hand. According to various embodiments, if the changed display position is covered by a rotation of the rotatable member 303, the electronic device may sense the current position of the hand again, may rechange the display position of the first group 1401 and the second group 1409b or of the supplementary information 1403 on the basis of the sensed position of the hand, and may display the first group 1401 and the second group 1405b or the supplementary information 1403 in the rechanged display position. The electronic device may display at least one object on the screen of the display 305 while changing at least one of the display position of the displayed objects, the size thereof, the number thereof, the color thereof, or the visual effect thereof in response to and adaptively to the rotation of the rotatable member 303 on the basis of information regarding the sensed position of the hand.

Figure 15:
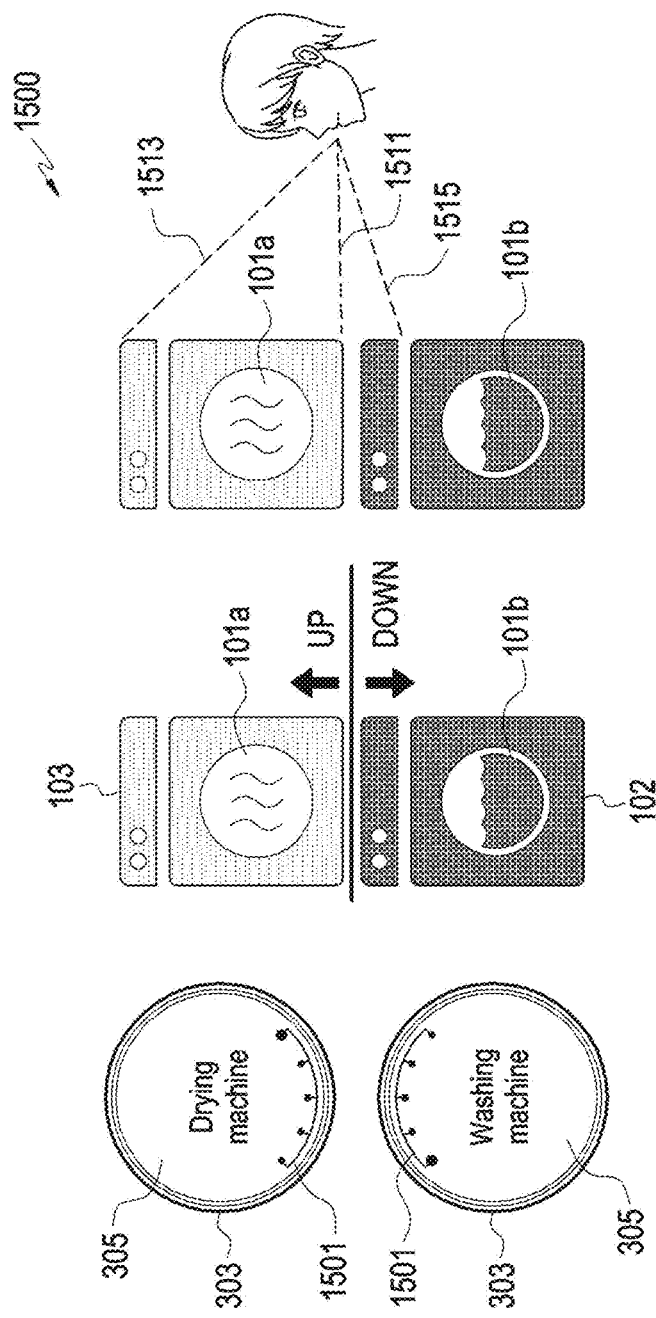
FIG. 15 is a diagram illustrating a screen related to interworking between an electronic device and external devices according to an embodiment of the disclosure.

FIG. 15 is a diagram illustrating a screen related to interworking between an electronic device according to an embodiment and external devices of the disclosure.

The electronic device according to various embodiments may be mounted on external devices (for example, home appliances) employed by the user, or may interwork with the external devices so as to provide the user with recommended functions in an environment 1500.

Referring to FIG. 15, when electronic device 101a is applied to a first external device (for example, a washing machine) 102, and when the first external device 102 interworks with a different second external device 103 and is arranged below the second external device 103, the electronic device 101a may recognize the user and identify the horizontal position 1511 to which the line of sight of the user is directed. If the display 305 of the electronic device 101a is in a lower position 1515 with reference to the horizontal position 1511, the electronic device 101a may change the display position of an object 1501 corresponding to a basic function or of an object corresponding to an additional function to the upper area of the display and may display the object 1501 corresponding to the basic function or the object corresponding to the additional function in the changed display position.

When electronic device 101b is applied to a second external device (for example, a drying machine) 103, and when the second external device 103 interworks with the first external device 102 and is arranged above the first external device 102, the electronic device 101b may recognize the user and identify the horizontal position 1511 to which the line of sight of the user is directed. If the display 305 of the electronic device 101b is in an upper position 1513 with reference to the horizontal position 1511, the electronic device 101 may change the display position of the object 1501 corresponding to a basic function or of an object corresponding to an additional function to the lower area of the display, and may display the object 1501 corresponding to the basic function or the object corresponding to the additional function in the changed display position.

In addition, according to various embodiments, it is possible to provide objects (for example, objects that enable a user interface) in different positions on the display 305 according to a position combination, such as the left side or the right side, including a case in which the first external device 102 including the electronic device 101a and the second external electronic device 103 including the electronic device 101b are positioned on the upper end or the lower end. For example, when the first external device 102 including the electronic device 101a is arranged on the left side, and when the second external electronic device 103 including the electronic device 101b is arranged on the right side, the electronic device 101a may change the display position of objects to the right area and may display the objects in the changed display position, and the electronic device 101b may change the display position of objects to the left area and may display the objects in the changed display position.

According to various embodiments, when at least one different external electronic device (for example, external electronic device 103) is arranged adjacent to the first external device 102 including the electronic device 101a, the electronic device 101a may display an object corresponding to the function of the first external device 102 and an object corresponding to the function of the at least one different external electronic device together on the display (for example, the display 305 of FIG. 3) of the electronic device 101a. For example, the display area on the display may be divided, the object corresponding to the function of the first external electronic device 102 may be displayed in the first area, and the object corresponding to the function of the second external electronic device 103 may be displayed in the second area. The function of the second external electronic device 103 may be acquired from the second external electronic device 103 through short-distance wireless communication. According to various embodiments, if the display of the different external electronic device is covered, or if the different external electronic device includes no display, the electronic device 101a (for example, the electronic device 101 of FIG. 1) may acquire the function of the different external electronic device through wireless communication and may display an object corresponding to the acquired function on the display (for example, the display 305 of FIG. 3).

Figure 16:
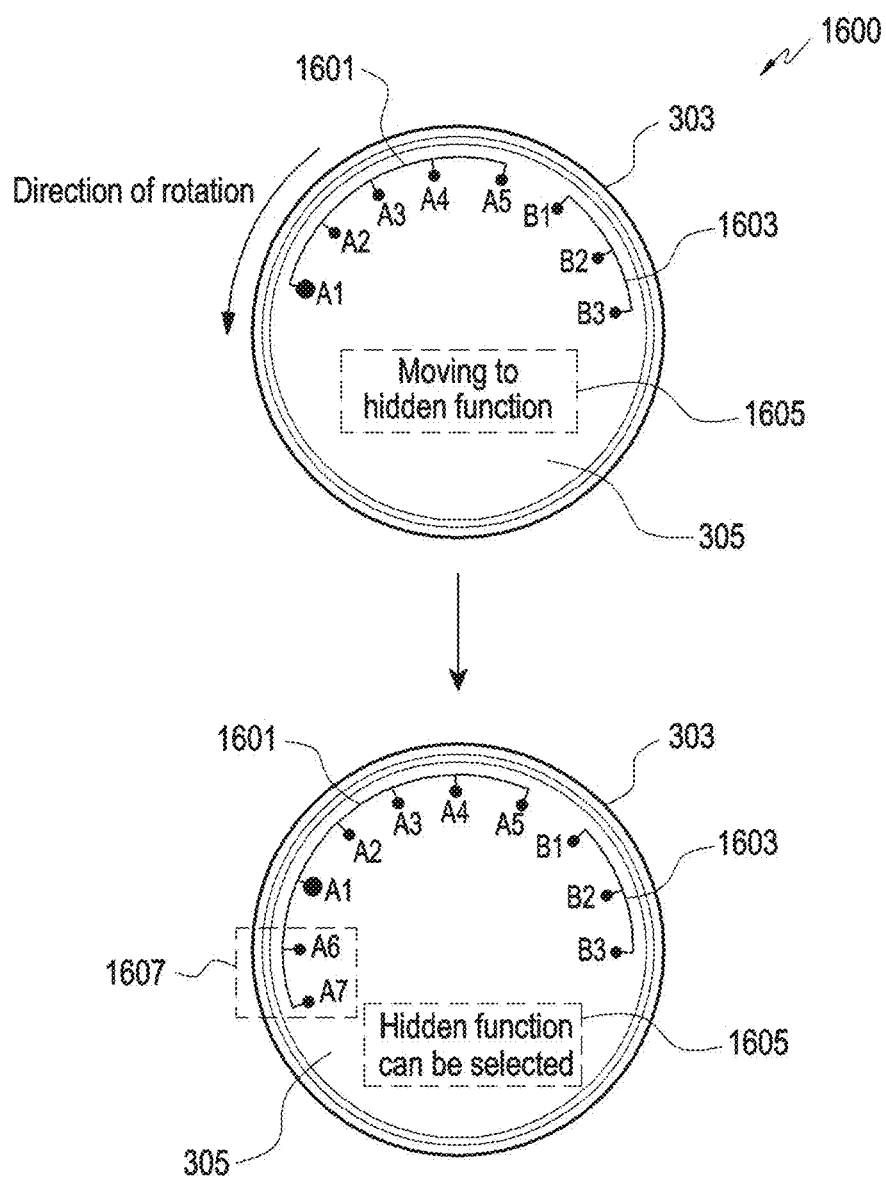
FIG. 16 is a diagram further illustrating a screen related to an operating procedure of an electronic device according to an embodiment of the disclosure.

FIG. 16 is a diagram further illustrating a screen related to an operating procedure of an electronic device according to an embodiment.

Referring to FIG. 16, the electronic device according to various embodiments may sense a rotation of the rotatable member 303 by using a sensor module arranged outside the rotatable member 303. In response to a rotation of the rotatable member 303, the electronic device may identify the direction of rotation of the rotatable member 303 on the basis of the rotation sensing information. According to various embodiments, when it is determined that the direction of rotation is a second direction (for example, counterclockwise), the electronic device may identify the display position of an indicator that indicates one of the objects A1, A2, A3, A4, and A5 included in a first group 1601 and the objects B1, B2, and B3 included in a second group 1603, displayed on the screen 1600 of the display 305. When the display position of the indicator indicates the first object A1 included in the first group 1601, and when the rotatable member 303 keeps rotating in the second direction past the first object A1, the electronic device may display at least one object 1607 corresponding to at least one hidden function in an adjacent area that extends from the display position of the first object A1 along the peripheral edge of the screen. According to various embodiments, if the rotatable member 303 keeps rotating in the second direction, the electronic device may display notification information 1605 (for example, "Moving to hidden function" or "Hidden function can be selected") for indicating display of the hidden function. According to various embodiments, when the indicator indicates the third object B3 included in the second group 1603, and when the rotatable member 303 keeps rotating past the third object B3, the electronic device may display the hidden function 1607 in an adjacent area that extends from the display position of the third object along the peripheral edge of the screen, as in the operation of FIG. 16. According to various embodiments, when the rotatable member rotates in a second direction (for example, counterclockwise) that is opposite to the first direction (for example, clockwise), the electronic device may delete or hide the at least one object corresponding to at least one hidden function such that the same disappears from the screen.

Figure 17:
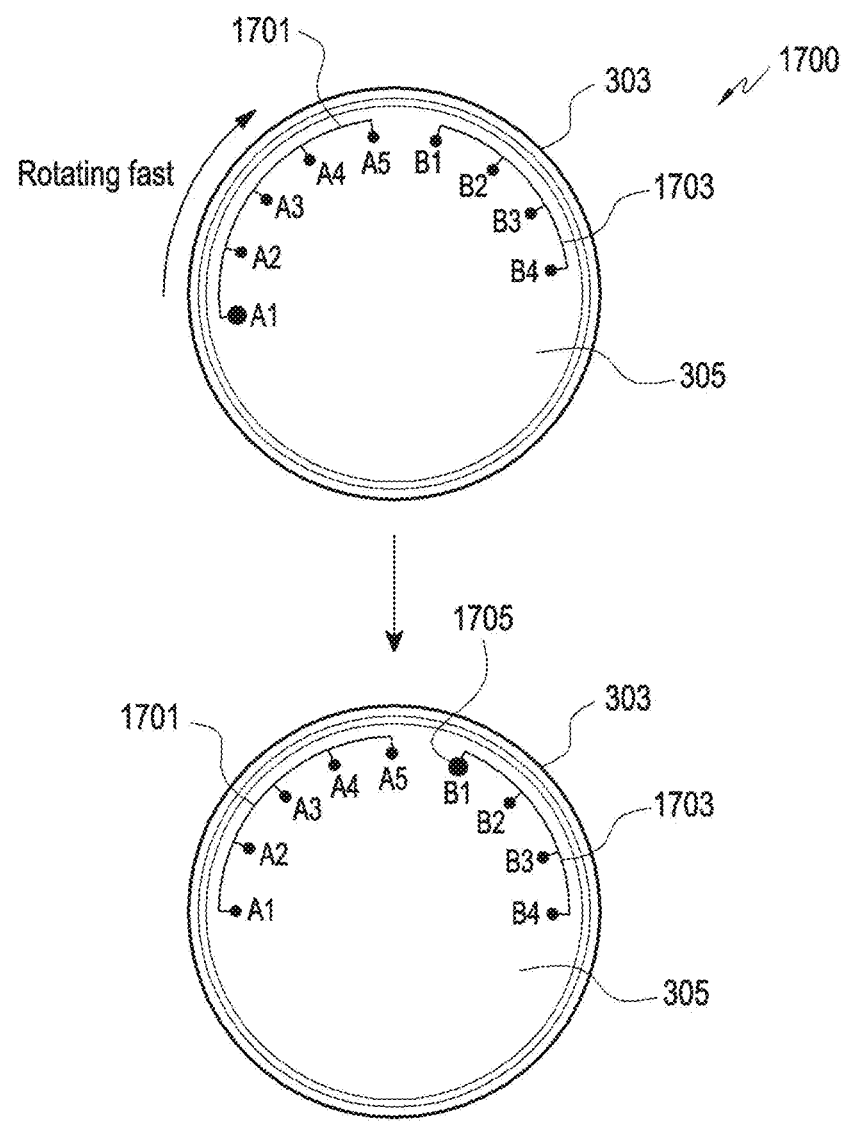
FIG. 17 is a diagram further illustrating a screen related to an operating procedure of an electronic device according to an embodiment of the disclosure.

FIG. 17 is a diagram illustrating a screen related to an operating procedure of an electronic device according to an embodiment of the disclosure.

FIGS. 18A, 18B, 18C, and 18D are diagrams further illustrating screens related to an operating procedure of an electronic device according to various embodiments of the disclosure.

Referring to FIG. 17, the electronic device according to various embodiments may display a first group including objects A1, A2, A3, A4, and A5 corresponding to basic functions and a second group including objects B1, B2, and B3 corresponding to additional functions on the screen 1700 of the display 305. The electronic device may sense the rate of rotation of the rotatable member 303 or the direction of rotation thereof by using a sensor module arranged outside the rotatable member 303. When the rotatable member 303 is rotating faster than a designated rate of rotation, the electronic device may display an indicator, which indicates an object (for example, A1) included in a first group 1701, for example, such that the indicator jumps from the first group 1701 to a second group 1703 and indicates an object 1705 (for example, B1) included in the second group 1703.

Figure 18:
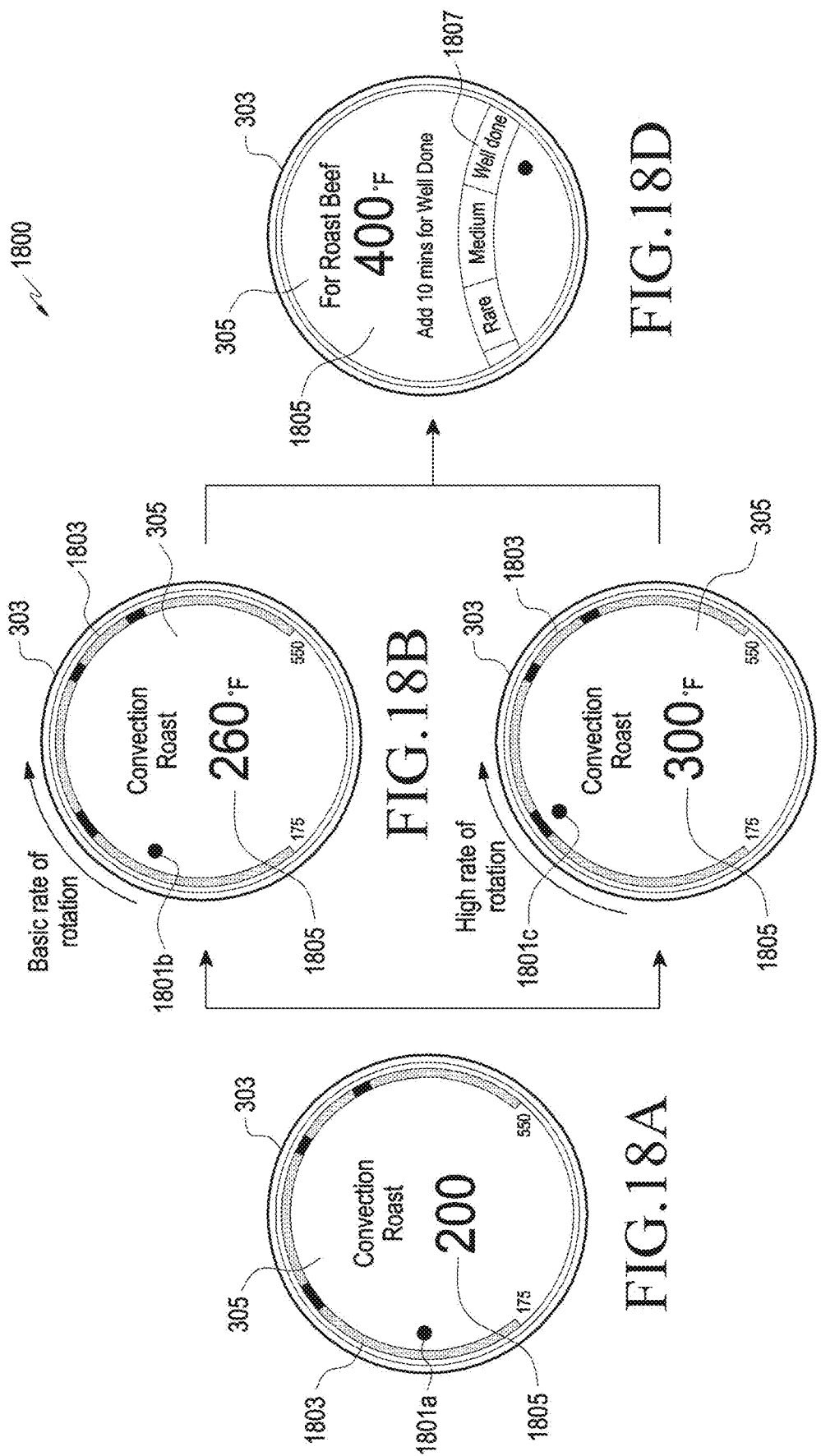
FIGS. 18A, 18B, 18C, and 18D are diagrams further illustrating screens related to an operating procedure of an electronic device according to various embodiments of the disclosure.

Referring to FIG. 18A, 18B, 18C, and FIG. 18D, the electronic device according to various embodiments may provide functions provided by an oven, for example. The electronic device may display objects 1803 indicating temperatures in connection with cooking. According to various embodiments, when the rate of rotation of the rotatable member 303 is sensed to be equal to or lower than a designated rate, the electronic device may display an indicator such that the same moves from display position 1801*a* of the indicator as illustrated in FIG. 18A (for example, display position of an object indicating 200° F.) to display position 1801*b* as illustrated in FIG. 18B (for example, display position of an object indicating 260° F.). According to various embodiments, when the rate of rotation of the rotatable member 303 is sensed to be equal to or higher than the designated rate, the electronic device may display an indicator such that the same jumps from the display position 1801*a* of the indicator as illustrated in FIG. 18A (for example, display position of an object indicating 200° F.) to display position 1801*c* as illustrated in FIG. 18C (for example, display position of an object indicating 300° F.). According to various embodiments, if the rotatable member 303 keeps moving such that the indicator reaches the object indicating a recommend temperature range (for example, 400° F.), the electronic device may expand the object that indicates the recommended temperature range and may display a new expanded object 1807 that indicates an expanded function (additional function) on the screen. The new expanded object 1807 may be displayed in an area on the screen distinguished from the objects 1803 indicating the temperature range. According to various embodiments, when the indicator moves to an object indicating a temperature range, the electronic device may display detailed information regarding the object indicated as a result of the movement on the screen as supplementary information 1805.

Figure 19:
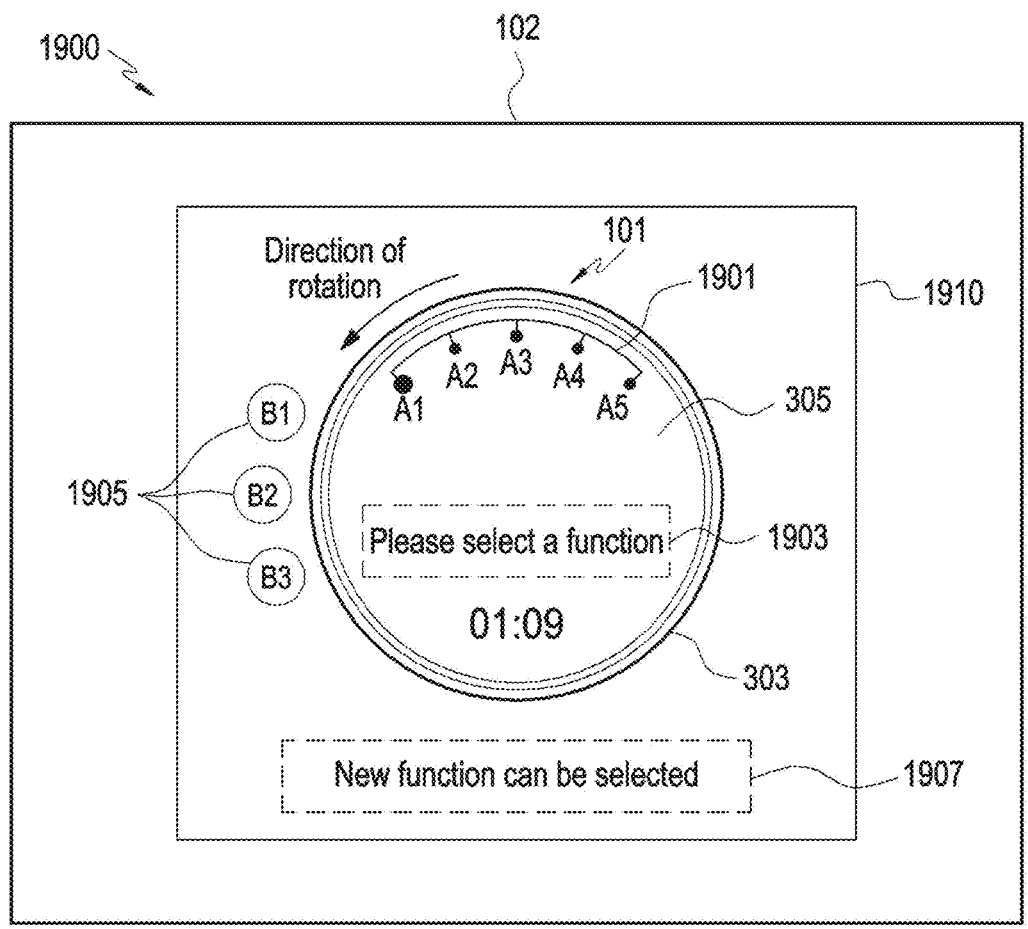
FIG. 19 is a diagram further illustrating a screen related to interworking between an electronic device and an external device according to an embodiment of the disclosure.

FIG. 19 is a diagram further illustrating a screen related to interworking between an electronic device and an external device according to an embodiment of the disclosure.

Figure 20:
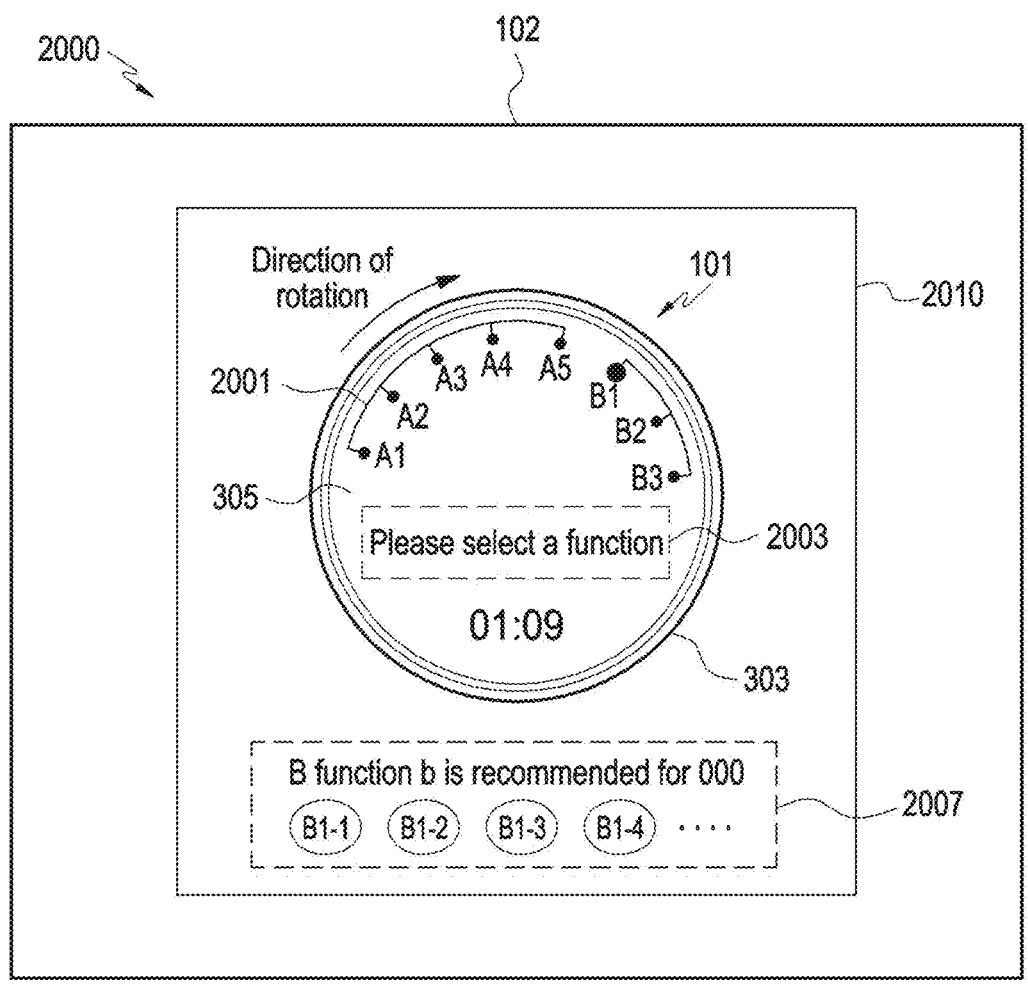
FIG. 20 is a diagram further illustrating a screen related to interworking between an electronic device and an external device according to an embodiment of the disclosure.

FIG. 20 is a diagram further illustrating a screen related to interworking between an electronic device and an external device according to an embodiment of the disclosure.

The electronic device according to various embodiments may be mounted to be electrically connected to external devices (for example, home appliances) employed by the user or may interwork with the external devices through short-distance wireless communication. The electronic device according to various embodiments may additionally provide functions provided by the external electronic devices, may interwork with the displays included in the external devices, and may display additional functions or supplementary information on the displays of the external devices.

Referring to FIG. 19, according to various embodiments, the electronic device 101 may display a first group 1901 including objects A1, A2, A3, A4, and A5 corresponding to basic functions on the screen 1900 of the display 305. The electronic device 101 may display notification information 1903 indicating that at least one object can be selected from the objects included in the first group 1901. According to various embodiments, the electronic device may display a second group 1905 including at least one object B1, B2, or B3 corresponding to the at least one additional function on the screen of display 1910 of the external device 102. When the rotatable member 303 of the electronic device 101 rotates in a second direction (for example, counterclockwise), it is possible to select at least one object (for example, B1) included in the second group 1905 indicated by the indicator that moves in response to the rotation of the rotatable member 303. The electronic device 101 may transmit a control signal to the external device 102 so as to execute the function corresponding to the selected object (for example, B1). According to various embodiments, the electronic device may transmit supplementary information 1907 to the external device 102 such that the supplementary information is displayed on the display 1910 of the external device 102. According to various embodiments, the additional information 1905 or supplementary information 1907 displayed on the display 1910 of the external device 102 may be displayed on the display 303 of the electronic device 101 according to the context.

Referring to FIG. 20, according to various embodiments, the electronic device 101 may display a first group 2001 including objects A1, A2, A3, A4, and A5 corresponding to basic functions, together with a second group 2005 including at least one object B1, B2, or B3 corresponding to the at least one additional function, on the screen 2000 of the display 305. According to various embodiments, the electronic device 101 may generate a function provided by the external device 102 as the additional function. The electronic device 101 may display notification information 2003 indicating that at least one object can be selected from the objects included in the first group 2001. The electronic device may identify an object (for example, B1) indicated by an indicator, which moves in response to a rotation of the rotatable member 303 and may transmit detailed information regarding the function corresponding to the identified object (for example, B1) to the external electronic device 102, as supplementary information 2007, such that the detailed information can be displayed on display 2010 of the external device 102. The supplementary information 2007 displayed on the display 2010 of the external electronic device 102 may also be displayed on the display 303 of the electronic device 101 according to the context. The supplementary information 2007 may display detailed information regarding the function (for example, "Function B1 is recommended for . . . ") corresponding to the identified object (for example, B1) and an additional function related to the function corresponding to the object B1 or at least one object (at least one of B1-1, B1-2, B1-3, B1-4, . . . , B1-*n*) corresponding to sub-functions included in the function. According to various embodiments, the at least one object related to the additional function (or sub-function) may be displayed as an object that enables a user interface.

According to various embodiments, the electronic device 101 may display the first group 1901 or 2001, which is displayed on the display 303, on the display 1910 or 2010 of the external electronic device 102 according to the context, and may, to the contrary, display the supplementary information 1907 or 2007 or the second group 1905, which is displayed on the display 1910 or 2010 of the external electronic device 102, on the display 303. According to various embodiments, the electronic device 101 may display an additional function corresponding to the function provided by the external device on the display 1910 or 2010 of the external device 102 and may display functions provided by the electronic device 101 on the display 303.

A method for operating an electronic device including a rotatable member, according to one of various embodiments, may include the operations of controlling a display so as to display a first group including at least one object corresponding to at least one basic function on a screen of the display, the display being exposed through a part of a front surface of a housing of the electronic device, and controlling the display so as to display a second group including at least one object corresponding to at least one additional function related to a user or the electronic device, together with the first group, on the screen in response to occurrence of an event.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a non-transitory computer-readable storage medium in a programming module form. When the instruction is executed by one or more processors (e.g., the processor 120 in FIG. 1), the one or more processors may perform a function corresponding to the command. The computer-readable storage medium may be, for example, a memory (for example, the memory 130 of FIG. 1).

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments, there may be provided a non-transitory computer-readable recording medium in which a program to be executed by a computer is recorded. The program may include executable instructions that, when executed by at least one processor, cause the at least one processor to control a display to display a first group including at least one object corresponding to at least one basic function on a screen of the display, the display being exposed through a part of a front surface of a housing of an electronic device including a rotatable member, and control the display to display a second group including at least one object corresponding to at least one additional function related to a user or the electronic device, together with the first group, on the screen in response to occurrence of an event.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a rotatable member rotatably arranged outside a part of the housing;
a display exposed through a part of a front surface of the housing;
a memory arranged inside the housing; and
at least one processor arranged inside the housing so as to be connected to the display and the memory electrically or functionally,
wherein the memory is configured to store instructions that, when executed, cause the at least one processor to:
control the display to display a first group comprising at least one first object respectively corresponding to at least one basic function on a screen of the display, and
control the display to display a second group comprising at least one second object respectively corresponding to at least one additional function related to a user or the electronic device, together with the first group, on the screen in response to occurrence of a first event,
wherein the at least one basic function corresponds to the user,
wherein the at least one basic function is, among a plurality of functions provided by the electronic device, determined based on a number of times by which each of the plurality of functions is used by the user for a predetermined period,
wherein the instructions are further configured to cause the at least one processor to:
identify a first horizontal position to which a line of sight of a user is directed and a second horizontal position in which the display of the electronic device is arranged, when the electronic device is electrically connected to an external electronic device to which the electronic device is mounted,
based on the second horizontal position being equal to or higher than the first horizontal position, control the display to display the first group and the second group at a lower end of the display, and
based on the second horizontal position being lower than the first horizontal position, control the display to display the first group and the second group at a upper end of the display, and
wherein the second group further comprises at least one object respectively corresponding to at least one function of the external electronic device.

2. The electronic device of claim 1, wherein the instructions are further configured to cause the at least one processor to:
control the display, when the rotatable member is rotated, to display an indicator moving among the at least one first object and the at least one second object on the screen in response to the rotation, identify a function corresponding to an object displayed in an area in which the indicator is positioned, and control the display to display supplementary information related to the identified function on the screen.

3. The electronic device of claim 1, wherein the instructions are further configured to cause the at least one processor to control the display to:
when displaying the second group, change a display position of the first group such that the at least one second object related to the at least one additional function is not overlapped and display supplementary information related to the additional function on the display, and return to a display state prior to display of the second group when a second event occurs while the first group is displayed, and wherein the second event comprises at least one of a termination of execution of the selected function occurs, or the first event not occurring during a designated time.

4. The electronic device of claim 1, wherein the instructions are further configured to cause the at least one processor to:
acquire context information in response to occurrence of the first event, select the at least one additional function from the plurality of functions provided by the electronic device based on the acquired context information, and control the display to display a second group comprising the at least one second object related to the at least one selected additional function, together with the first group, and wherein the first event comprises at least one of a user recognition gesture, a touch input by the rotatable member, information reception or reservation notification, mounting on or interworking with an external device, or user input information reception.

5. The electronic device of claim 1, wherein the instructions are further configured to cause the at least one processor to:
receive information regarding a service provided by an external device by using a transceiver or an input interface, generate at least one new recommended function based on the received information regarding a service, and control the display to display an object related to the generated new recommended function on the screen.

6. The electronic device of claim 1, wherein the instructions are further configured to cause the at least one processor to:
sense a position of a hand of a user by using at least one sensor, identify an area on the screen corresponding to the sensed position of the hand, and change display positions of the first group and the second group to a different area facing the identified area.

7. The electronic device of claim 1, wherein the instructions are further configured to cause the at least one processor to:
control the display to display on the screen, at least one third object corresponding to at least one hidden function when the rotatable member is rotated toward a first direction at or above a designated rate of rotation, and control the display such that the at least one third object corresponding to the at least one hidden function disappears from the screen when the rotatable member rotates toward a second direction that is opposite to the first direction.

8. The electronic device of claim 1, wherein the instructions are further configured to cause the at least one processor to:
move an indicator to jump between groups when the rotatable member is rotated at or above a designated rate, and change a display position of the indicator to indicate an object displayed in a position to which the indicator is moved.

9. A method for operating an electronic device comprising a rotatable member, the method comprising:
controlling a display of the electronic device to display a first group comprising at least one first object respectively corresponding to at least one basic function on a screen of the display, the display being exposed through a part of a front surface of a housing of the electronic device; and controlling the display to display a second group comprising at least one second object respectively corresponding to at least one additional function related to a user or the electronic device, together with the first group, on the screen in response to occurrence of an event, wherein the at least one basic function corresponds to the user, wherein the at least one basic function is, among a plurality of functions provided by the electronic device, determined based on a number of times by which each of the plurality of functions is used by the user for a predetermined period, wherein the method further comprises:
identifying a first horizontal position to which a line of sight of a user is directed and a second horizontal position in which the display of the electronic device is arranged, when the electronic device is electrically connected to an external electronic device to which the electronic device is mounted, based on the second horizontal position being equal to or higher than the first horizontal position, controlling the display to display the first group and the second group at a lower end of the display, and based on the second horizontal position being lower than the first horizontal position, controlling the display to display the first group and the second group at a upper end of the display, and wherein the second group further comprises at least one object respectively corresponding to at least one function of the external electronic device.

10. A non-transitory computer-readable recording medium in which a program to be executed by a computer is recorded, the program comprising executable instructions that, when executed by at least one processor of an electronic device, cause the at least one processor to:
control a display of the electronic device to display a first group comprising at least one first object respectively corresponding to at least one basic function on a screen of the display, the display being exposed through a part of a front surface of a housing of the electronic device comprising a rotatable member, and control the display to display a second group comprising at least one second object respectively corresponding to at least one additional function related to a user or the electronic device, together with the first group, on the screen in response to occurrence of a first event, wherein the at least one basic function corresponds to the user, wherein the at least one basic function is, among a plurality of functions provided by the electronic device, determined based on a number of times by which each of the plurality of functions is used by the user for a predetermined period, wherein the program further comprises executable instructions configured to cause the at least one processor to:

identify a first horizontal position to which a line of sight of a user is directed and a second horizontal position in which the display of the electronic device is arranged, when the electronic device is electrically connected to an external electronic device to which the electronic device is mounted, based on the second horizontal position being equal to or higher than the first horizontal position, control the display to display the first group and the second group at a lower end of the display, and based on the second horizontal position being lower than the first horizontal position, control the display to display the first group and the second group at a upper end of the display, and wherein the second group further comprises at least one object respectively corresponding to at least one function of the external electronic device.

11. The recording medium of claim 10, wherein the program further comprises executable instructions configured to cause the at least one processor to:

control the display, when the rotatable member is rotated, to display an indicator moving among the at least one first object and the at least one second object on the screen in response to the rotation, identify a function corresponding to an object displayed in an area in which the indicator is positioned, control the display to display supplementary information related to the identified function on the screen, and execute the identified function.

12. The recording medium of claim 10, wherein the recording medium further comprises executable instructions configured to cause the at least one processor to:

control the display, when displaying the second group, to change a display position of the first group such that the at least one second object related to the at least one additional function is not overlapped and display supplementary information related to the additional function on the display, and control the display to return to a display state prior to display of the second group when a second event occurs while the first group is displayed, and wherein the second event comprises at least one of a termination of execution of the selected function occurs, or the first event not occurring during a designated time.

13. The recording medium of claim 10, wherein the recording medium further comprises executable instructions configured to cause the at least one processor to:

acquire context information in response to occurrence of the first event, select the at least one additional function from the plurality of functions provided by the electronic device based on the acquired context information, and control the display to display a second group comprising the at least one second object related to the at least one selected additional function, together with the first group, and wherein the first event comprises at least one of a user recognition gesture, a touch input by the rotatable member, information reception or reservation notification, mounting on or interworking with an external device, or user input information reception.

14. The recording medium of claim 10, wherein the recording medium further comprises executable instructions configured to cause the at least one processor to:

receive information regarding a service provided by an external device by using a transceiver or an input interface, generate at least one new recommended function based on the received information regarding a service, and control the display to display an object related to the generated new recommended function on the screen.

15. The recording medium of claim 10, wherein the recording medium further comprises executable instructions configured to cause the at least one processor to:

sense a position of a hand of a user by using at least one sensor, identify an area on the screen corresponding to the sensed position of the hand, and change display positions of the first group and the second group to a different area facing the identified area.

16. The recording medium of claim 10, wherein the recording medium further comprises executable instructions configured to cause the at least one processor to:

control the display to display, on the screen, at least one third object corresponding to at least one hidden function when the rotatable member is rotated toward a first direction at or above a designated rate of rotation, and control the display such that the at least one third object corresponding to the at least one hidden function disappears from the screen when the rotatable member rotates toward a second direction that is opposite to the first direction.

* * * * *